United States Patent
Narumi et al.

(10) Patent No.: US 8,130,623 B2
(45) Date of Patent: Mar. 6, 2012

(54) OPTICAL INFORMATION RECORDING AND/OR REPRODUCING APPARATUS, OPTICAL INFORMATION RECORDING AND/OR REPRODUCING METHOD, OPTICAL INFORMATION RECORDING MEDIUM, AND SOLID IMMERSION LENS

(75) Inventors: Kenji Narumi, Osaka (JP); Masahiro Birukawa, Osaka (JP); Rie Kojima, Osaka (JP); Eiichi Ito, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/993,599

(22) PCT Filed: May 18, 2009

(86) PCT No.: PCT/JP2009/002180
§ 371 (c)(1),
(2), (4) Date: Nov. 19, 2010

(87) PCT Pub. No.: WO2009/141994
PCT Pub. Date: Nov. 26, 2009

(65) Prior Publication Data
US 2011/0069599 A1      Mar. 24, 2011

(30) Foreign Application Priority Data
May 23, 2008   (JP) ................................. 2008-135130

(51) Int. Cl.
*G11B 7/135*      (2006.01)
(52) U.S. Cl. ................................................. 369/112.23
(58) Field of Classification Search .............. None
See application file for complete search history.

(56) References Cited

U.S. PATENT DOCUMENTS 5,903,530 A * 5/1999 Tateishi et al. ............. 369/44.27
(Continued)

FOREIGN PATENT DOCUMENTS

EP        1260972 A2 * 11/2002
(Continued)

OTHER PUBLICATIONS

International Search Report issued Aug. 4, 2009 in International (PCT) Application No. PCT/JP2009/002180.

*Primary Examiner* — Joseph Feild
*Assistant Examiner* — Parul Gupta
(74) *Attorney, Agent, or Firm* — Wenderoth, Lind & Ponack, L.L.P.

(57) ABSTRACT

An optical information recording and/or reproducing apparatus comprises: a focusing unit (11) which collects generated near-field light on an optical disc (1); a first detector (17) which receives light reflected by the optical disc (1) and outputs an electric signal according to the quantity of the received light; and a distance control circuit (22) which controls the distance between the focusing unit (11) and a light entrance surface of the optical disc (1), using the electric signal that is output from the first detector (17), and the optical disc (1) has at least N (N is an integer of 2 or greater) number of information layers, and a distance d0 from the light entrance surface to a first information layer which is most distant from the light entrance surface and a distance dn from the light entrance surface to an Nth information layer which is closest to the light entrance surface satisfy the relationship of $dn \geq d0 \times (1/25)$. As a result, servo control can be accurately performed regardless which information layer, out of a plurality of information layers of an optical disc, information is recorded to or reproduced from.

12 Claims, 15 Drawing Sheets

U.S. PATENT DOCUMENTS

| | | |
|---|---|---|
| 6,383,595 B1 * | 5/2002 | Hirotsune et al. ............ 428/64.1 |
| 7,106,683 B2 | 9/2006 | Saito et al. |
| 7,440,383 B2 | 10/2008 | Saito et al. |
| 7,907,497 B2 * | 3/2011 | Nakano et al. ............ 369/112.01 |
| 7,986,609 B2 * | 7/2011 | Lee et al. .................... 369/275.1 |
| 2004/0013077 A1 | 1/2004 | Saito et al. |
| 2004/0047271 A1 | 3/2004 | Mizuno |
| 2006/0274610 A1 | 12/2006 | Saito et al. |
| 2007/0217300 A1 | 9/2007 | Koyama et al. |

FOREIGN PATENT DOCUMENTS

| | | |
|---|---|---|
| JP | 2002-50043 | 2/2002 |
| JP | 2004-46915 | 2/2004 |
| JP | 2005-332449 | 12/2005 |
| JP | 2006-4596 | 1/2006 |
| JP | 2006-209850 | 8/2006 |
| JP | 2007-164868 | 6/2007 |
| JP | 2007-293963 | 11/2007 |
| WO | 03/021583 | 3/2003 |

* cited by examiner

TILT DETECTION SIGNAL

OPTICAL INFORMATION RECORDING AND/OR REPRODUCING APPARATUS, OPTICAL INFORMATION RECORDING AND/OR REPRODUCING METHOD, OPTICAL INFORMATION RECORDING MEDIUM, AND SOLID IMMERSION LENS

TECHNICAL FIELD

The present invention relates to an optical information recording and/or reproducing apparatus and an optical information recording and/or reproducing method which optically records and/or reproduces data, and an optical information recording medium and solid immersion lens which are used for this optical information recording and/or reproducing apparatus, and more particularly to an optical information recording and/or reproducing apparatus, an optical information recording and/or reproducing method, an optical information recording medium and a solid immersion lens which use near-field light.

BACKGROUND ART

Recently technology using near-field light has been proposed as a technology which allows recording and/or reproducing data on optical discs at high density.

As a focusing unit for generating near-field light, an optical system in which a focusing lens and a solid immersion lens (hereafter called "SIL") are combined, is receiving attention lately. By the combination of a focusing lens and an SIL, a higher NA (Numerical Aperture) than that of a focusing lens can be realized. If a numerical aperture of the optical system is increased, the size of a light spot can be decreased, which allows higher density recording.

In the case of an optical system using an SIL, it is necessary for light, which comes out of the emission surface of the SIL, to enter the surface of the optical disc, so the distance between the SIL and the surface of the optical disc must be very short. In the case of an optical system used for an optical information recording and/or reproducing apparatus which records and/or reproduces information on a DVD or the like, the distance between the objective lens and the surface of the optical disc is approximately 1 mm, but in the case of an SIL, the distance between the emission surface of the SIL and the surface of the optical disc is approximately 100 nm or less. If the distance between the SIL and the surface of the optical disc fluctuates, the near-field light may not be obtained, or the SIL may collide with the optical disc. Hence a control to maintain the distance of the SIL and the surface of the optical disc to be constant is required.

In order to realize this control, a method called "gap servo" was proposed. This method is disclosed in Patent Literature 1. According to this method, light having a predetermined polarization component is detected out of the reflected light from the optical disc based on the near-field light. This light corresponds to light reflected from an area where the near-field light is generated, and is also called the "return light". An actuator actively adjusts the positions of the focusing lens and the SIL in the optical axis direction, so that the quantity of light of this return light becomes constant. Thereby the distance (gap) between the SIL and the surface of the optical disc is controlled.

On the other hand, as a method for improving the recording density at the optical disc side, a multilayer disc, in which a plurality of information layers are disposed in the optical axis direction, was proposed. Patent Literature 2 discloses an apparatus which records information on a multilayer disc by an optical system using SIL.

A tilt control, for actively controlling the tilt of the focusing unit so that the emission surface of an SIL and the surface of the disc become parallel with each other, was also proposed. This tilt control method will now be described with reference to FIG. 12A to FIG. 13B.

FIG. 12A to FIG. 13B are diagrams depicting the positional relationship between an optical disc 1 and SIL 13, a state of a return light spot 203 irradiated onto a detector (also called "photodetector") 901, and a configuration of a tilt detection circuit.

FIG. 12A is a diagram depicting a positional relationship between the optical disc 1 and the SIL 13, and FIG. 12B is a diagram depicting the state of the return light spot 203 irradiated onto the detector 901 when the optical disc 1 and the SIL 13 are in the positional relationship shown in FIG. 12A. FIG. 13A is a diagram depicting a positional relationship of the optical disc 1 and the SIL 13, and FIG. 13B is a diagram depicting the state of the return light spot 203 irradiated onto the detector 901 when the optical disc 1 and the SIL 13 are in the positional relationship shown in FIG. 13A. The detector 901 consists of two sub-detectors 201 and 202.

In FIG. 12A, the distance a1 between the edge of the SIL 13 at the inner circumference side of the optical disc 1 and the surface of the optical disc 1 is longer than the distance a2 between the edge of the SIL 13 at the outer circumference side of the optical disc 1 and the surface of the optical disc 1. As FIG. 12A shows, the optical disc 1 is warped in a concave shape when viewed from the light entrance side, and if the emission surface of the SIL 13 and the surface of the optical disc 1 are not parallel, the distribution of the quantity of light of the return light spot 203 is not uniform, since the distance between the emission surface and the disc surface is not constant on the emission surface of the SIL 13.

In other words, according to the above mentioned principle of the gap servo, the quantity of light of the return light changes roughly in proportion to the distance between the SIL 13 and the optical disc 1. Therefore the quantity of light of the return light spot 203, at the side where the distance between the emission surface and the disc surface is short, is relatively low, and the quantity of light of the return light spot 203, at the side where the distance is long, is relatively high. The sub-detectors 201 and 202 detect the quantity of light of the return light spot 203 respectively, and convert it into electric signals. The differential circuit 401 outputs the difference of each electric signal converted by the sub-detectors 201 and 202, as a tilt detection signal. In the state of FIG. 12B, the differential circuit 401 outputs the tilt detection signal having a negative voltage value.

In FIG. 13A, the distance a3 between the edge of the SIL 13 at the inner circumference side of the optical disc 1 and the surface of the optical disc 1 is longer than the distance a4 between the edge of the SIL 13 at the outer circumference side of the optical disc 1 and the surface of the optical disc 1. As FIG. 13A shows, in the case of the optical disc 1 warped in a convex shape when viewed from the light entering side, the relationship of the quantity of light of the return light spot 203 at the side where the distance between the emission surface and the disc surface is shorter, and the quantity of light of the return light spot 203 at the side where the distance is longer, is the opposite of FIG. 12A and FIG. 12B. In the state of FIG. 13A, if the sub-detectors 201 and 202 detect the quantity of light of the return light spot 203 in the same manner as the case of FIG. 12B, the differential circuit 401 outputs the tilt detection signal having a positive voltage value.

The tilt control circuit controls an actuator holding the SIL 13, using a tilt detection signal, in a direction to cancel the tilt of the surface of the optical disc 1 and the SIL 13. The voltage value of the tilt detection signal becomes zero if the surface of the optical disc 1 and the emission surface of the SIL 13 become parallel. In this state, the aberration of the light spot irradiated onto the information layer of the optical disc 1 is the minimum, and the information can be accurately recorded or reproduced. The possibility of the SIL 13 and the optical disc 1 contacting can also be decreased.

In the above mentioned conventional method, however, the following problem exists in the case of recording or reproducing data on a multilayer disc.

Gap servo controls the distance between the disc surface and the SIL by detecting the return light, from an area where the near-field light is generated, using a detector. The size of the area where the near-field light is generated depends on the depth from the disc surface to the information layer. In other words, the area is largest when the information is recorded to or reproduced from an information layer most distant from the disc surface (this layer is called the "first information layer L0"), and the area is smallest when the information is recorded to or reproduced from an information layer closest to the disc surface (this layer is called the "Nth information layer L(n−1)"). This is because the focusing position in the optical axis direction changes depending on the information layers to be recorded or reproduced, so the spot size of the laser beam on the emission surface of the SIL changes. Therefore according to the change of the light spot size on the emission surface of the SIL, the spot size on the detector changes accordingly.

In the case of a single layer disc having only one information layer, the problem that occurs due to the change of the light spot size is not generated. This is because the distance from the disc surface to the focusing position of the laser beam is always constant, and the size of the area where the near-field light is generated is also constant, therefore it is sufficient if an appropriate detection lens is disposed on the optical path to reach the detector, so that the light spot size becomes the optimum on the detector.

In the case of a multilayer disc, however, the following problems occur. Now the problems on the multilayer disc will be described with reference to FIG. 14A to FIG. 15B.

FIG. 14A to FIG. 15B are diagrams depicting a positional relationship between the optical disc 1 and the SIL 13, a state of a return light spot 203 irradiated onto a detector 901 and a configuration of a tilt detection circuit when recording to or reproducing from the Nth information layer L(n−1). FIG. 14A to FIG. 15B show a case of the optical disc 1 and the emission surface of the SIL 13 which are parallel.

FIG. 14A is a diagram depicting a positional relationship between the optical disc 1 and the SIL 13, and FIG. 14B is a diagram depicting the state of the return light spot 203 irradiated onto the detector 901 when the optical disc 1 and the SIL 13 are in the positional relationship shown in FIG. 14A. FIG. 15A is a diagram depicting a positional relationship of the optical disc 1 and the SIL 13, and FIG. 15B is a diagram depicting the state of the return light spot 203 irradiated onto the detector 901 when the position of the detector 901 is shifted.

If a detection lens, with which the size of the return light spot 203 on the detector 901 becomes optimal, is used when information is recorded to or reproduced from the first information layer L0, the size of the return light spot 203 on the detector 901 becomes smaller than the size of the detector 901, as shown in FIG. 14B, when information is recorded to or reproduced from the Nth information layer L(n−1).

If the position of the detector 901 is shifted from the center of the light spot in this state, due to aging and temperature characteristics of the pickup, the state of the return light spot 203 irradiated onto the detector 901 becomes as shown in FIG. 15B. FIG. 15B shows an example when the position of the detector 901 is shifted Δm in a direction parallel with the dividing direction in the detector.

In this case, a difference is generated in the quantity of light which enters the two sub-detectors 201 and 202. As a result, offset voltage is generated in the tilt detection signal, although the optical disc 1 and the emission surface of the SIL 13 are parallel, and the tilt of the SIL 13 cannot be accurately controlled.

If a detection lens, with which the size of the return light spot 203 on the detector 901 becomes optimal, is used when information is recorded to or reproduced from the Nth information layer L(n−1), on the other hand, the size of the return light spot 203 on the detector 901 becomes relatively larger when information is recorded to or reproduced from the first information layer L0. At the moment, the diameter or length of one side of the detector used for a standard optical disc drive is about 100 μm. Larger detectors are also available on the market, but the frequency characteristics of detectors tend to drop as size increases. Therefore if the detector size is increased, a quick change in the quantity of light cannot be detected as electric signals, and therefore servo control cannot be performed with desired frequency characteristics.

Citation List

Patent Literature

Patent Literature 1: International publication No. 03/021583 pamphlet

Patent Literature 2: Japanese Patent Application Laid-Open No. 2004-46915

SUMMARY OF INVENTION

To solve the above problems, it is an object of the present invention to provide an optical information recording and/or reproducing apparatus, an optical information recording and/or reproducing method, an optical information recording medium and a solid immersion lens with which servo control can be accurately performed regardless which information layer, out of a plurality of information layers of the optical disc, the information is recorded to or reproduced from.

An optical information recording and/or reproducing apparatus according to an aspect of the present invention has: a focusing unit which generates near-field light and collects the near-field light on an optical information recording medium; a light receiving unit which receives lights reflected by the optical information recording medium, and outputs an electric signal according to a quantity of the received light; and a distance control unit which controls a distance between the focusing unit and a light entrance surface of the optical information recording medium, using the electric signal that is output from the light receiving unit, and the optical information recording medium has at least N (N is an integer of 2 or greater) number of information layers, and a distance d0 from the light entrance surface of the optical information recording medium to a first information layer which is most distant from the light entrance surface, and a distance d0 from the light entrance surface of the optical information recording medium to an Nth information layer which is closest to the light entrance surface, satisfy the relationship of $dn \geq d0 \times (1/25)$.

According to this configuration, the focusing unit generates near-field light and collects the near-field light on the optical information recording medium, the light receiving unit receives light reflected by the optical information recording medium, and outputs an electric signal according to the quantity of the received light, and the distance control unit controls the distance between the focusing unit and the light entrance surface of the optical information recording medium, using the electric signal that is output from the light receiving unit. The optical information recording medium has at least N (N is an integer of 2 or greater) number of information layers. And the distance d0 from the light entrance surface of the optical information recording medium to the first information layer which is most distant from the light entrance surface, and the distance dn from the light entrance surface of the optical information recording medium to the Nth information layer which is closest to the light entrance surface, satisfy the relationship of $dn \geq d0 \times (1/25)$.

According to the present invention, the difference of the light spot size on the light receiving unit between the case of recording or reproducing information to/from the first information layer which is most distant from the light entrance surface of the optical information recording medium, and the case of recording or reproducing information to/from the Nth information layer which is closest to the light entrance surface of the optical information recording medium, can be sufficiently small, so the offset generated in the electric signal, which is output from the light receiving unit, can be decreased, and servo control can be accurately performed.

The objects, characteristics and advantages of the present invention will be more apparent after reading the following detailed description along with the accompanying drawings.

DESCRIPTION OF EMBODIMENTS

Embodiments of the present invention will now be described with reference to the accompanying drawings. The following embodiment is an example of an embodiment of the present invention, and is not intended to restrict the technical scope of the present invention.

Figure 1:
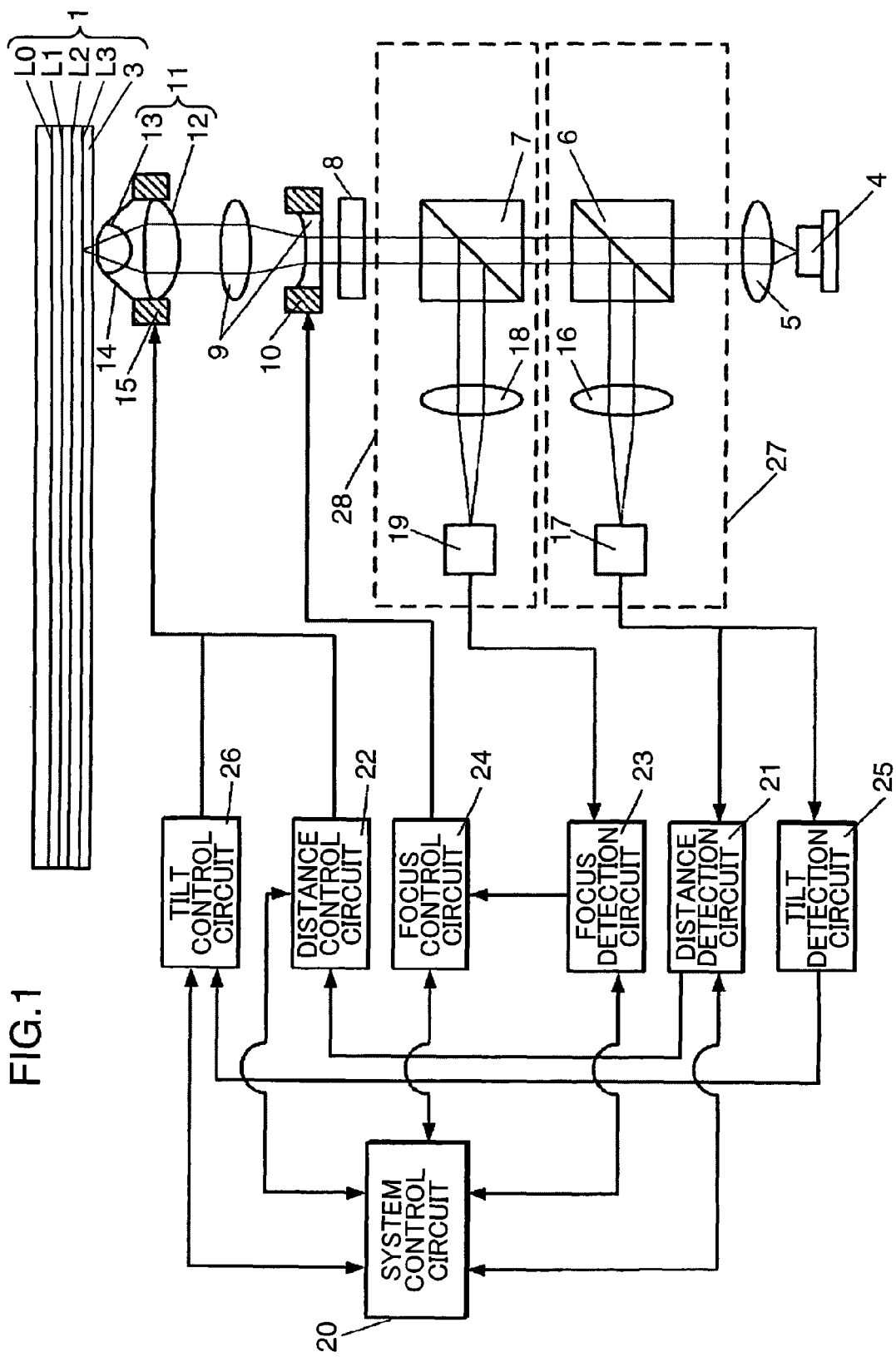
FIG. 1 is a diagram depicting a configuration of an optical information recording and/or reproducing apparatus according to the present embodiment.

First a configuration of an optical information recording and/or reproducing apparatus according to the present embodiment will be described with reference to FIG. 1. FIG. 1 is a diagram depicting the configuration of the optical information recording and/or reproducing apparatus according to the present embodiment.

In the beginning, a forward optical system, which exists in an optical path from a laser to an optical disc, and a configuration of the optical disc will be described.

The optical information recording and/or reproducing apparatus has a laser 4, a collimator lens 5, a non-polarization beam splitter 6, a polarization beam splitter 7, a ¼ wavelength plate 8, a beam expander 9, an actuator 10, a focusing unit 11, an actuator 15, a first detection lens 16, a first detector 17, a second detection lens 18, a second detector 19, a system control circuit 20, a distance detection circuit 21, a distance control circuit 22, a focus detection circuit 23, a focus control circuit 24, a tilt detection circuit 25 and a tilt control circuit 26.

The optical disc 1 includes a plurality of information layers (four layers in the present embodiment) L0 to L3 on which actual information is recorded, and a cover layer (also called the "protective layer") 3 which protects the plurality of information layers L0 to L3. The laser 4 is a light source which emits a laser beam for recording to and/or reproducing information from the optical disc 1. The collimator lens 5 collimates the laser beam emitted from the laser 4 into a parallel beam.

The non-polarization beam splitter 6 and the polarization beam splitter 7 split the reflected light from the optical disc 1. The non-polarization beam splitter 6 is a type of beam splitter of which reflection characteristic does not depend on the polarizing direction, and the polarization beam splitter 7 is a type of beam splitter which depends on the polarizing direction. The non-polarization beam splitter 6 splits the return light from an area where the near-field light is generated, and the polarization beam splitter 7 splits the reflected light from the information layer, that is a reflected light of the far-field light. The ¼ wavelength plate 8 converts the linear polarized light into circular polarized light, so that the polarization beam splitter 7 can split the reflected light of the far-field light.

The beam expander 9 expands a beam diameter of a laser beam. The actuator 10 is installed on at least one of the two lenses constituting the beam expander 9, so as to adjust the distance between the two lenses. Thereby the focusing position of the laser beam in the optical disc 1 can be adjusted. The adjustment unit for adjusting the focusing position is not limited to the beam expander 9, and a lens or optical element, for adjusting the focusing position, may be disposed on the optical path independently from the beam expander 9.

The actuator 10 moves at least one, out of the two lenses constituting the beam expander 9, in the optical axis direction so as to adjust the focusing position of the laser beam. Description on the configuration of the actuator 10, which is publically known, is omitted here.

The focusing unit 11 generates near-field light and collects the generated near-field light on the optical disc 1. The focusing unit 11 is constituted of two lenses: a focusing lens 12 and a solid immersion lens (hereafter SIL) 13. The SIL 13 is a lens which is hemispherical, and the plane side thereof has a taper cut, for example, and the plane side faces the surface of the optical disc 1. The focusing lens 12 and the SIL 13 are integrated and fixed by the lens holder 14, and the actuator 15 is installed on the lens holder 14. By driving the actuator 15, the distance between the surface of the optical disc 1 and the SIL 13, and the tilt of the focusing unit 11 including the SIL 13, are adjusted.

The actuator 15 moves the focusing unit 11 in the optical axis direction, so as to adjust the distance between the surface of the optical disc 1 and the SIL 13. The actuator 15 also tilts the focusing unit 11 in the radius direction of the optical disc 1, so as to adjust the tilt of the focusing unit 11. Description on the configuration of the actuator 15, which is publically known, is omitted here.

Now a backward optical system, from the optical disc 1 to the detector, will be described. The backward optical detection system consists of a first detection system 27 and a second detection system 28.

The configuration of the first detection system 27 will be described here.

Figure 12A:
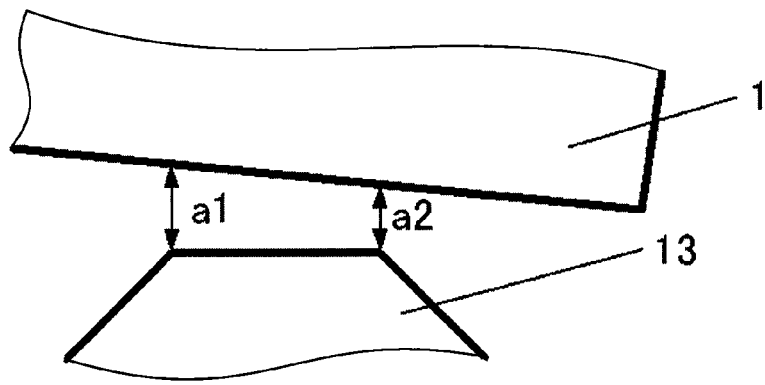
FIG. 12A is a diagram depicting a positional relationship between an optical disc and an SIL.
Figure 12B:
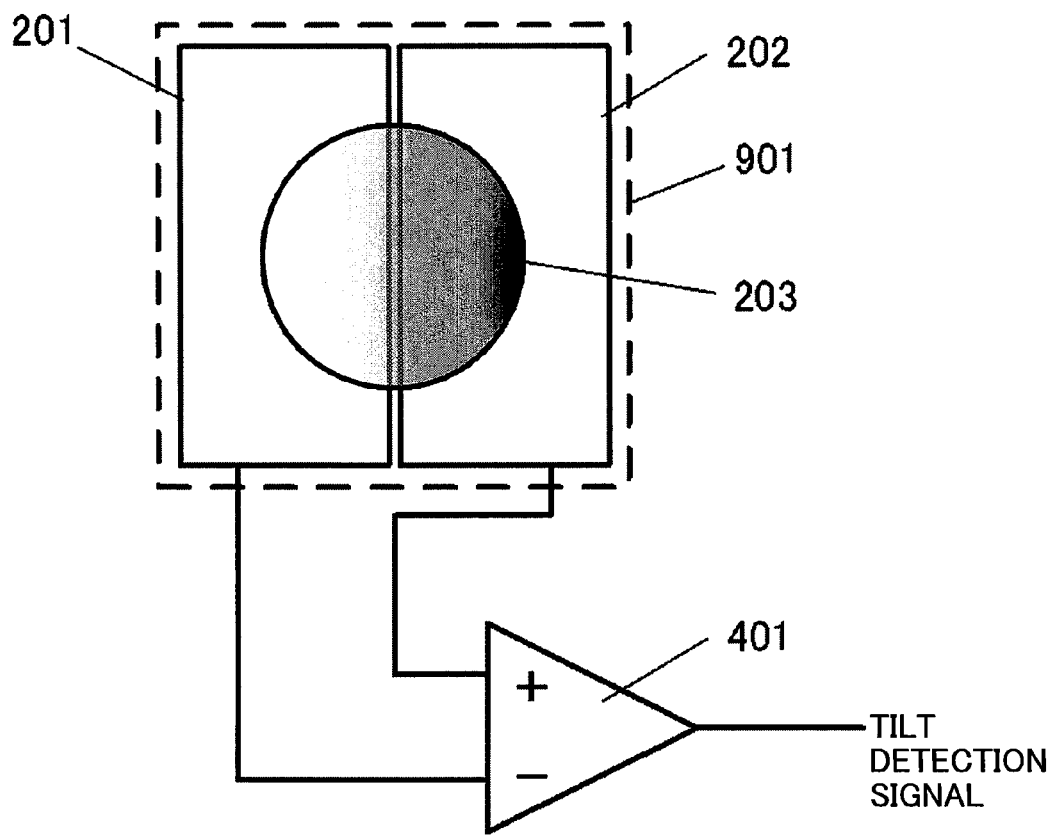
FIG. 12B is a diagram depicting a state of a return light spot irradiated onto a detector when the optical disc and the SIL are in the positional relationship shown in FIG. 12A.
Figure 13A:
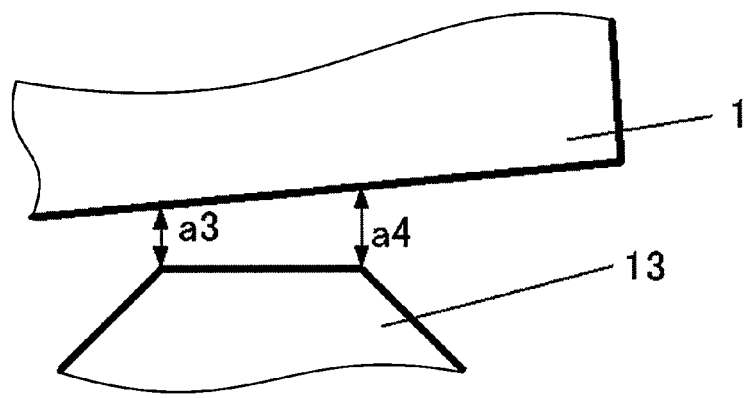
FIG. 13A is a diagram depicting a positional relationship between an optical disc and an SIL.
Figure 13B:
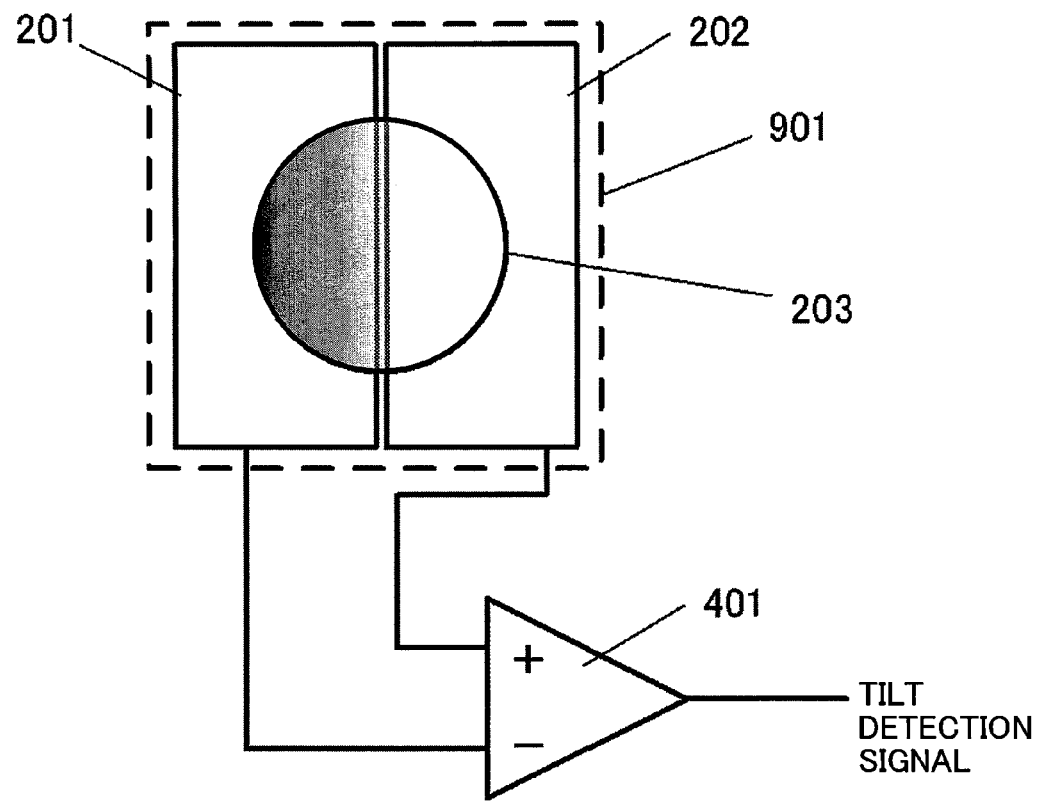
FIG. 13B is a diagram depicting a state of a return light spot irradiated onto a detector when the optical disc and the SIL are in the positional relationship shown in FIG. 13A.
Figure 14A:
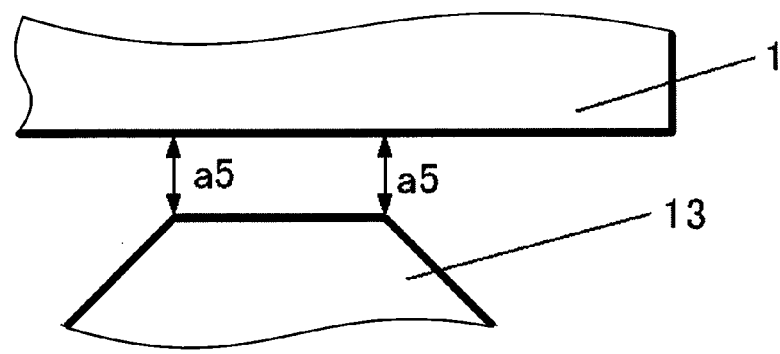
FIG. 14A is a diagram depicting a positional relationship between an optical disc and an SIL.
Figure 14B:
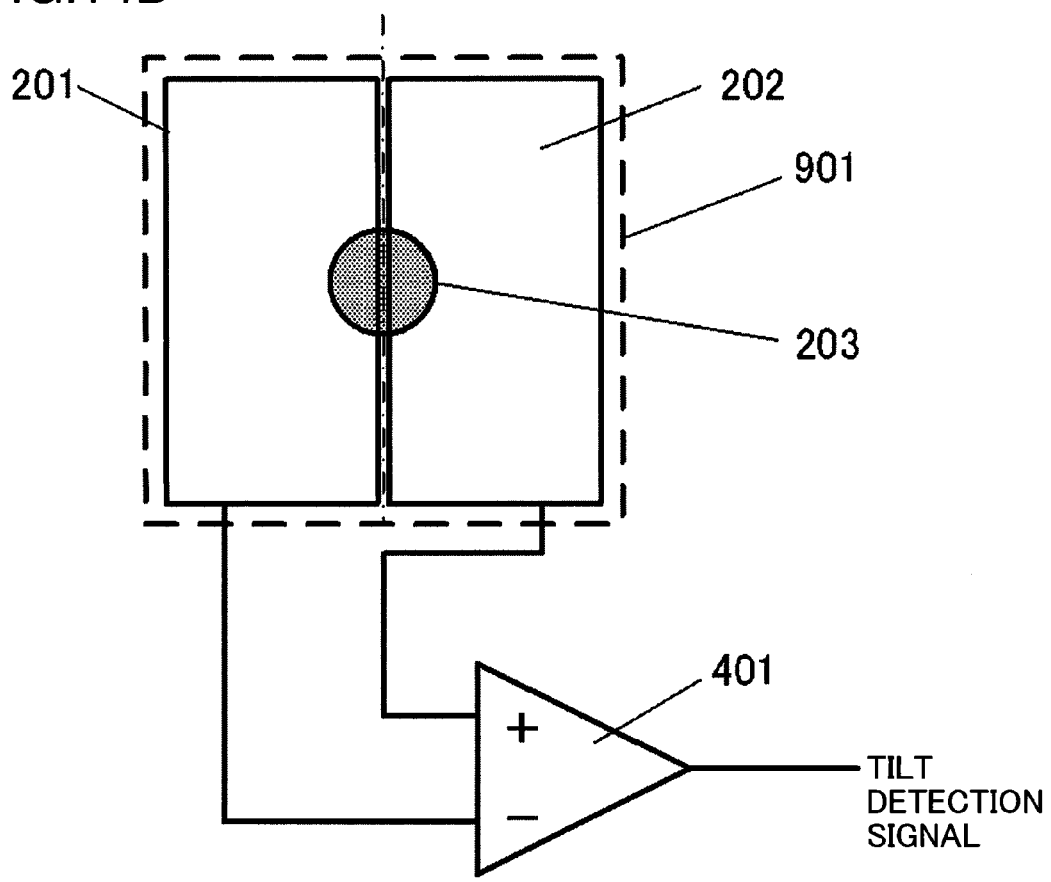
FIG. 14B is a diagram depicting a state of a return light spot irradiated onto a detector when the optical disc and the SIL are in the positional relationship shown in FIG. 14A.
Figure 15A:
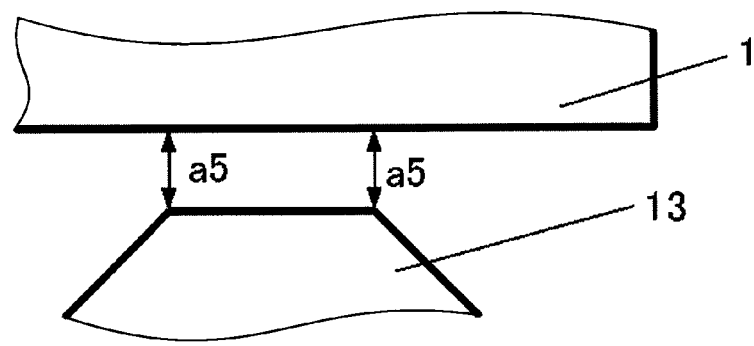
FIG. 15A is a diagram depicting a positional relationship between an optical disc and an SIL.
Figure 15B:
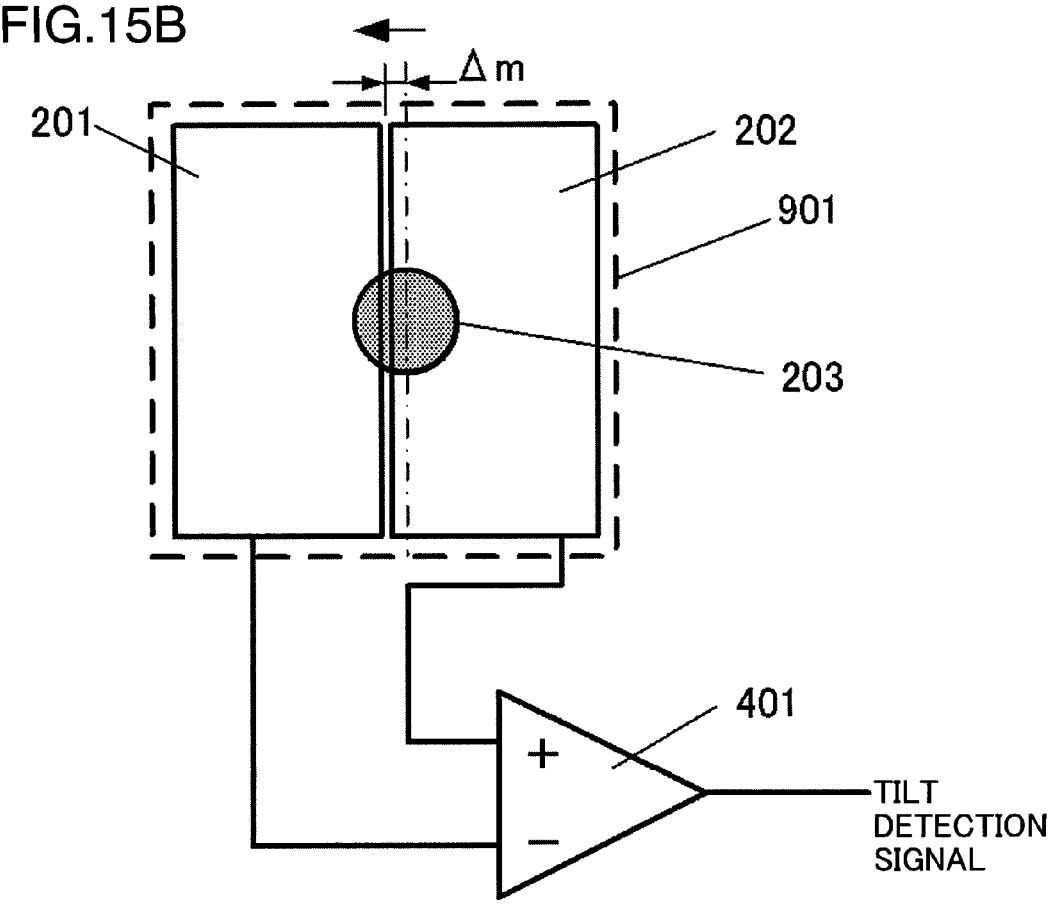
FIG. 15B is a diagram depicting a state of a return light spot irradiated onto a detector when the position of the detector is shifted in FIG. 15A.

The backward light reflected by the non-polarization beam splitter 6 is collected by the first detection lens 16, and enters the first detector 17. The first detector 17 consists of two sub-detectors 201 and 202, much like the detector 901 shown in FIG. 12B.

The quantity of light which enters the first detector 17 corresponds to the quantity of return light from the area where the near-field light is generated. The quantity of light changes depending on the distance between the SIL 13 and the surface of the optical disc 1. If the SIL 13 and the surface of the optical disc 1 are in full contact, the quantity of the transmission of the forward light which entered the SIL 13 to the surface of the optical disc 1 is the maximum, so the quantity of return light is the minimum. If the SIL 13 and the surface of the optical disc 1 are sufficiently separated, on the other hand, the near-field light is not generated, so the light in the zone portion of the light which entered the SIL 13 is totally reflected, and the quantity of the return light becomes the maximum.

In an intermediate position between the above two cases, the quantity of the return light changes approximately in proportion to the distance between the SIL 13 and the optical disc 1. Therefore if the near-field light is being generated by the SIL 13, the distance between the SIL 13 and the optical disc 1 can be detected by detecting the total quantity of light which enters the first detector 17.

The configuration of the second detection system 28 will be described next.

The backward light reflected by the polarization beam splitter 7 is collected by the second detection lens 18, and enters the second detector 19. The light that enters the second detector 19 corresponds to the light reflected by the first to fourth information layers L0 to L3 of the optical disc 1 respectively. In the state where the near-field light is generated, the laser beam transmits between the SIL 13 and the optical disc 1, so the reflected light from the first to fourth information layers L0 to L3 can be obtained.

The second detection lens 18 not only has the function of collecting the reflected lights to the second detector 19, but also has a function of detecting the focus state. For example, the second detection lens 18 may be a combination lens to detect the focus state based on an astigmatism method. Where the second detector 19 detects the focus state and the tracking state. For this, it is preferable that the light receiving element of the second detector 19 is divided into a plurality of portions.

Now configurations of an electric system and control system of the optical information recording and/or reproducing apparatus according to the present embodiment will be described.

The system control circuit 20 controls all of focus control, distance control and tilt control according to the present embodiment. The distance detection circuit 21 outputs the total quantity of light received by the first detector 17 as an electric signal (voltage value).

The distance control circuit 22 outputs drive current to the actuator 15 in order to adjust the position of the focusing unit 11 in the optical axis direction. Using an electric signal which is output from the first detector 17, the distance control circuit 22 controls the distance between the focusing unit 11 and the light entrance surface of the optical disc 1. The distance control circuit 22 performs servo control so that the distance between the SIL 13 and the surface of the optical disc 1 is maintained constant, by changing the drive current to be output to the actuator 15 so that the electric signal from the distance detection circuit 21 becomes constant.

The focus detection circuit 23 detects the focus state based on the light received by the second detector 19. It is preferable that the electric signal, which is output from the focus detection circuit 23, is a focus error signal (that is, a sigmoid curve signal). In this case, focus control is easy. The focus detection circuit 23 generates a focus error signal which becomes a positive voltage if focus is on the front side of a desired information layer when viewed from the entrance surface side, and becomes a negative voltage if focus is on the rear side of the desired information layer, where the state of focusing on the desired information layer is regarded as zero. The relationship between the focus position and the polarity of voltage, described above, may be reversed.

The focus control circuit 24 outputs drive current to the actuator 10 in order to adjust the focus position of the laser beam. The focus control circuit 24 changes the drive circuit, which is output to the actuator 10, so that the electric signal (voltage value) from the focus detection circuit 23 becomes zero or a predetermined value, and performs servo control in the optical axis direction, so that the focus position of the laser beam is maintained at a position of a desired information layer.

The tilt detection circuit 25 converts the distribution of the quantity of lights received by the first detector 17 into an electric signal (voltage value), and outputs the signal as a tilt detection signal. The tilt control circuit 26 outputs drive current to the actuator 15 in order to adjust the tilt of the focusing unit 11. Using the electric signal which is output from the first detector 17, the tilt control circuit 26 controls the tilt of the entrance surface of the optical disc 1 and the light emission surface of the SIL 13. The tilt control circuit 26 changes the drive current to be output to the actuator 15 based on the tilt detection signal, so as to control the tilt of the SIL 13.

The first detector 17 detects the light reflected by the optical disc 1, and outputs an electric signal according to the detected light to the distance detection circuit 21 and the tilt detection circuit 25.

According to the present embodiment, the first detector 17 consists of two sub-detectors 201 and 202, and the tilt control circuit 26 controls only the tilt of the optical disc 1 in the radius direction, however the present invention is not especially limited to this, whereas the first detector 17 may consist of four sub-detectors which are divided into a matrix, and the tilt control circuit 26 may control the tilt of the optical disc 1 in the radius direction and in a direction orthogonal to the radius direction.

FIG. 1 shows only the configuration required for describing the present embodiment, whereas a tracking control circuit for controlling tracking servo, a reproduction signal processing circuit for processing a reproduction signal, a circuit for generating a waveform of a recording pulse, or the like, are not illustrated. These circuits are added in an actual optical information recording and/or reproducing apparatus according to necessity.

In the present embodiment, the optical disc 1 corresponds to one example of the optical information recording medium, the focusing unit 11 corresponds to an example of the focusing unit, the first detector 17 corresponds to an example of the light receiving unit, and the distance detection circuit 21 and the distance control circuit 22 correspond to an example of the distance control unit, and the tilt detection circuit 25 and the tilt control circuit 26 correspond to an example of the tilt control unit.

Now a state of optical paths around the SIL 13 and the optical disc 1 when the laser beam is focused on an information layer of the multilayer disc, and a state of the return light spot on the first detector 17, will be described in detail.

Figure 2A:
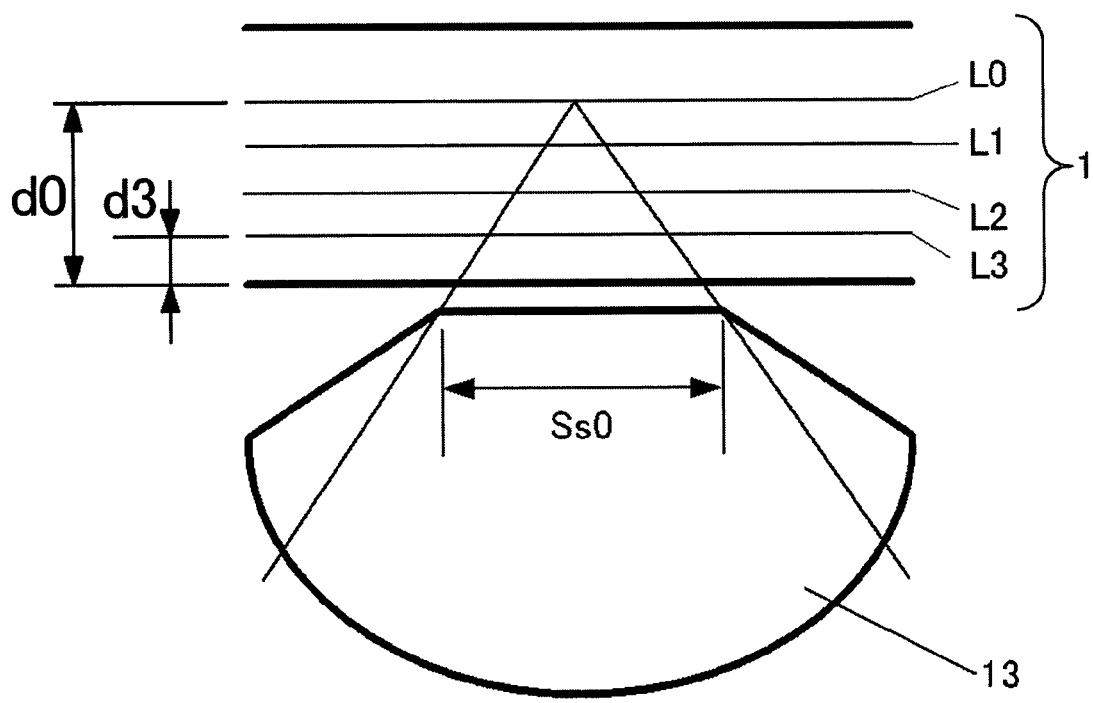
FIG. 2A is a diagram depicting a state of optical paths of an SIL and an optical disc when information is recorded to or reproduced from an information layer which is most distant from a light entrance surface of a multilayer disc.
Figure 2B:
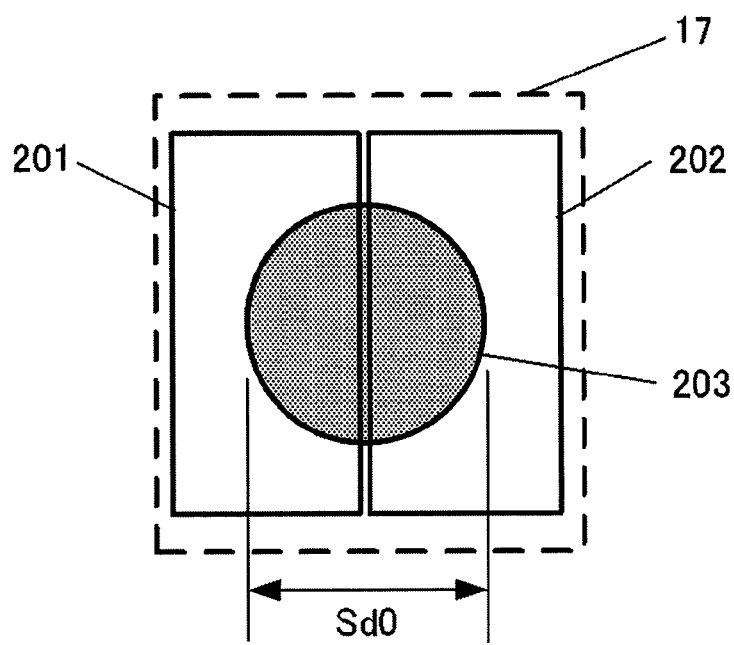
FIG. 2B is a diagram depicting a state of a return light spot irradiated onto a first detector when information is recorded to or reproduced from the information layer which is most distant from the light entrance surface of the multilayer disc.
Figure 3A:
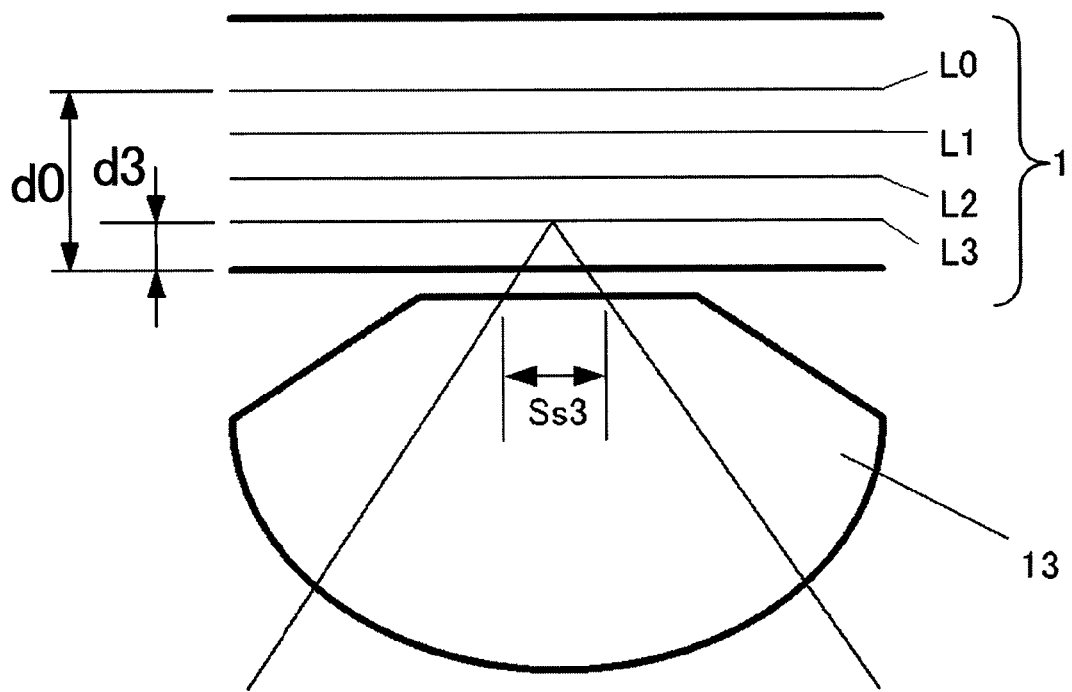
FIG. 3A is a diagram depicting a state of optical paths of the SIL and the optical disc when information is recorded to or reproduced from an information layer which is most distant from the light entrance surface of the multilayer disc.

FIG. 2A is a diagram depicting the state of optical paths around the SIL 13 and the optical disc 1 when information is recorded to or reproduced from an information layer which is most distant from the light entrance surface of the multilayer disc, and FIG. 2B is a diagram depicting the state of the return light spot 203 irradiated onto the first detector 17 when the information is recorded to or reproduced from the information layer which is most distant from the light entrance surface of the multilayer disc. FIG. 3A is a diagram depicting the state of optical paths around the SIL 13 and the optical disc 1 when information is recorded to or reproduced from an information layer which is closest to the light entrance surface of the multilayer disc, and FIG. 3B is a diagram depicting the state of the return light spot 203 irradiated onto the first detector 17 when the information is recorded to or reproduced from the information layer which is closest to the light entrance surface of the multilayer disc.

According to the present embodiment, a number of information layers of the optical disc 1 is four, and each information layer is defined as, in order from the light entrance side, a fourth information layer L3, a third information layer L2, a second information layer L1 and a first information layer L0. FIG. 2A shows the case when the information is recorded to or reproduced from the first information layer L0, which is a layer most distant from the light entrance surface, and FIG. 3A shows the case when the information is recorded to or reproduced from the fourth information layer L3, which is a layer closest to the light entrance surface.

In FIG. 2A and FIG. 2B, the laser beam is focused on the information layer which is most distant from the emission surface of the SIL 13, so the spot size Ss0 of the laser beam on the emission surface of the SIL 13 is the maximum. The size of the area where the near-field light is generated is in proportion to the spot size of the laser beam of the emission surface of the SIL 13, and the size of the return light spot 203 irradiated onto the first detector 17 is in proportion to the area where the near-field light is generated. Therefore the size of the return light spot 203 becomes the maximum when the laser beam is focused on the first information layer L0. The size of the return light spot 203 when the laser beam is focused on the first information layer L0 is defined as Sd0.

Figure 3B:
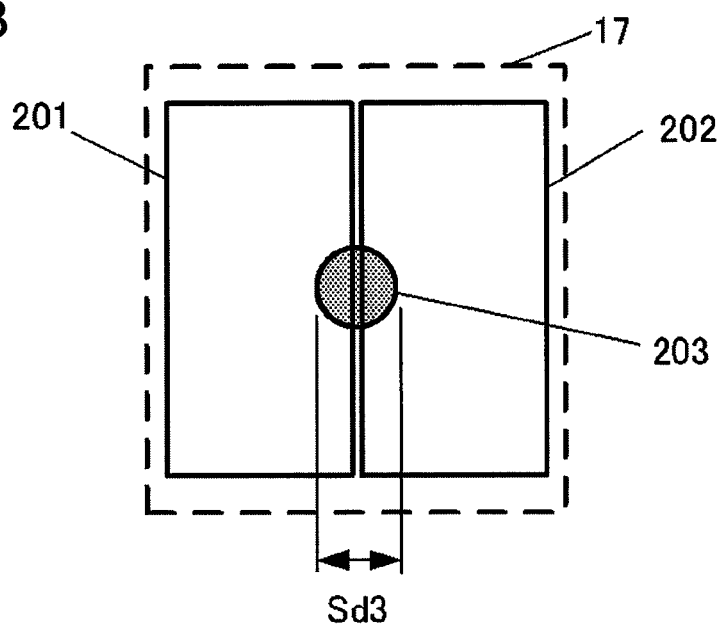
FIG. 3B is a diagram depicting a state of a return light spot irradiated onto the first detector when information is recorded to or reproduced from the information layer which is closest to the light entrance surface of the multilayer disc.

Whereas in FIG. 3A and FIG. 3B, the laser beam is focused on the information layer closest to the emission surface of the SIL 13, so the spot size Ss3 of the laser beam on the emission surface of the SIL 13 becomes the minimum. Therefore the size of the return light spot 203 becomes the minimum when the laser beam is focused on the fourth information layer L3. The size of the return light spot 203, when the laser beam is focused on the fourth information layer L3, is defined as Sd3.

Now the present embodiment will be described in more concrete terms based on the result of combining the principle confirmation experiment and calculation.

In experiment, a polycarbonate substrate on which spiral tracks (grooves) are formed is used as the substrate of the optical disc 1. The thickness of the substrate is 1.1 mm, the groove pitch is 200 nm, and the depth of a groove is 20 nm. For the first to fourth information layers L0 to L3, multilayer thin films, including a phase change recording layer respectively, are formed by a sputtering method. These multilayer thin films are formed to be a four-layer structure, where an Ag alloy reflection layer, ZnS—$SiO_2$ dielectric layer, GeSbTe phase change recording layer and ZnS—$SiO_2$ dielectric layer are deposited in order from the substrate side. In the experiment of the present embodiment, the laser light enters from the side opposite the substrate.

For the material of the reflection layer, it is better to use a material having high thermal conductivity, such as an Ag alloy. The thermal conductivity of the material of the reflection layer is preferably 200 W/mK. This is because the conduction of heat in the thickness direction of the optical disc when recording information can be prevented, and heat can be released in the film surface direction of the reflection layer, therefore the possibility of thermal deterioration of the information recorded in the adjacent information layers can be decreased. For the same reason, it is preferable that the thickness of the reflection layer be as thick as possible, so as to increase thermal capacity.

The first information layer L0 need not transmit light backward when viewed from the light entrance side. In other words, the first information layer L0 need not be semi-transparent. Hence the thickness of the Ag alloy layer of the first information layer L0 is thicker than the second information layer L1, the third information layer L2 and the fourth information layer L3. It is preferable that the first information layer L0 has a reflection layer of which thickness is 50 nm or more, and the second information layer L1, third information layer L2 and fourth information layer L3 have a reflection layer of which thickness is 6 nm or more.

For the transmittance of the second information layer L1, third information layer L2 and fourth information layer L3, the higher the better. And it is preferable that Rc/Ra is greater, where Re is a reflectance of the information layer when the phase change recording layer is in a crystal state, and Ra is a reflectance when the phase change recording layer is in an amorphous state, since the quality of the reproduction signal improves. In order to satisfy these conditions, the number of layers of the multilayer thin film of the second information layer L1, third information layer L2 and fourth information layer L3 may be greater than four.

Figure 4:
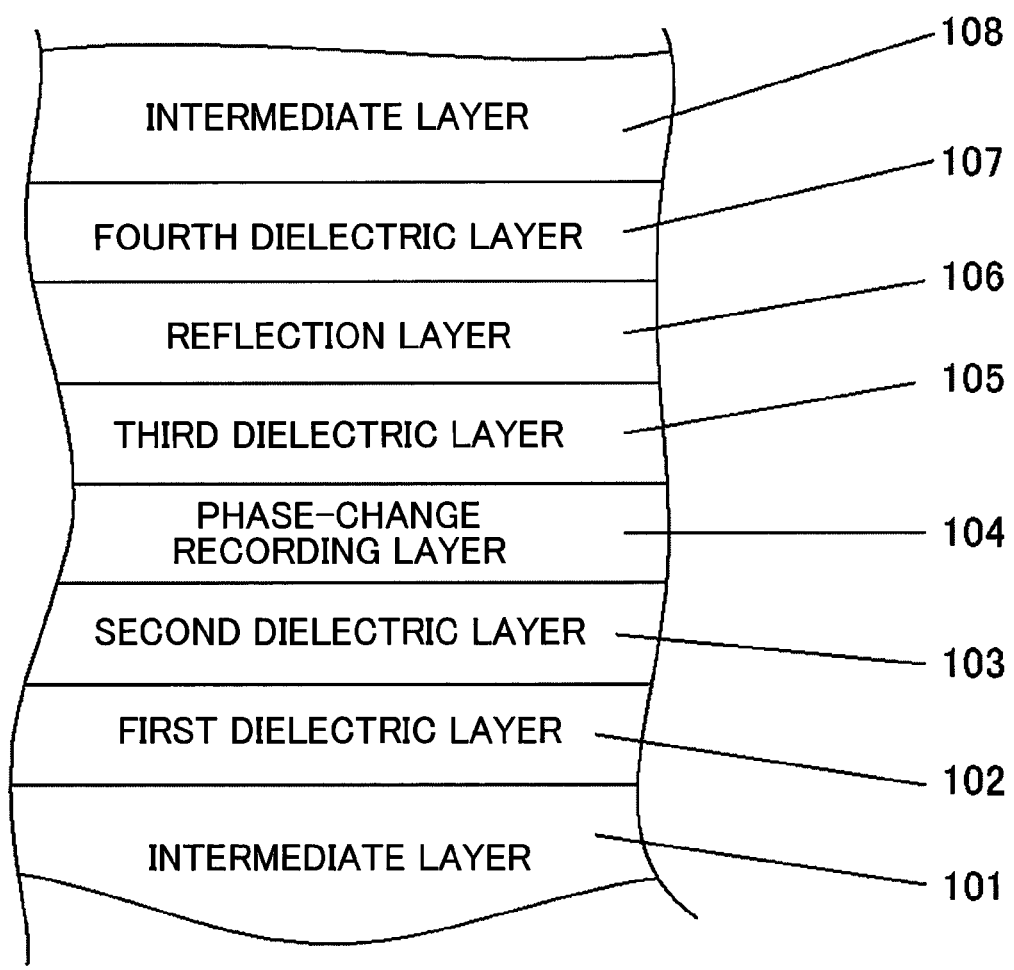
FIG. 4 is a diagram depicting an example of a configuration of a multilayer thin film which is preferable as the second information layer, third information layer or fourth information layer.

FIG. 4 is a diagram depicting an example of a preferred configuration of a multilayer thin film, as in the second information layer L1, third information layer L2 or fourth information layer L3. The configuration shown in FIG. 4 can be applied to an information layer of a plurality of information layers, except for the information layer most distant from the light entrance surface (first information layer L0 in the case of the present embodiment).

In this multilayer thin film, each thin film of first dielectric layer 102, second dielectric layer 103, phase change recording layer 104, third dielectric layer 105, reflection layer 106 and fourth dielectric layer 107 are deposited between an intermediate layer (cover layer in the case of the information layer closest to the light entrance surface) 101 and the intermediate layer 108, in order from the light entrance surface side. An interface layer of which thickness is 10 nm or less may be deposited between the phase change recording layer 104 and the second dielectric layer 103 or the third dielectric layer 105, although this is not shown in FIG. 4.

It is preferable that a dielectric material of which refractive index is high, such as $TiO_2$, is used for the fourth dielectric layer 107. If the refractive index $n0$ of the intermediate layer (or cover layer) 101, the refractive index $n1$ of the first dielectric layer 102, and the refractive index $n2$ of the second dielectric layer 103 satisfy the relationship of $n1<n0<n2$, the transmittance and Rc/Ra can be increased, and the quality of the reproduction signal can be improved.

In this way, at least one information layer, other than the first information layer L0, out of the plurality of information layers of the optical disc 1, is constituted by a multilayer thin film in which the first dielectric layer 102, the second dielectric layer 103, the phase change recording layer 104, the third dielectric layer 105, the reflection layer 106 and the fourth dielectric layer 107 are deposited in order from the light entrance side. The refractive index $n0$ of the cover layer and the intermediate layer, the refractive index $n1$ of the first dielectric layer 102, and the refractive index $n2$ of the second dielectric layer 103 satisfy the relationship of the following Expression (1).

$$n1<n0<n2 \quad (1)$$

Thereby the thickness of the first dielectric layer 102 can be increased, and the conduction of heat to adjacent information layers can be decreased, which is preferable. The reason is because the thermal conductivity of the material used for the dielectric layer is normally lower than that of the material used for the phase change recording layer and the reflection layer, so the heat during recording can be more easily confined to the phase change recording layer by increasing the thickness of the first dielectric layer.

In the configuration shown in FIG. 4, high transmittance and high Rc/Ra, sufficient for the second information layer L1, the third information layer L2 or the fourth information layer L3, can be implemented if the thickness of the first dielectric layer 102 is set to 40 nm or more. The refractive index $n0$ of the intermediate layer 101 is 1.8, for example, and the refractive index $n1$ of the first dielectric layer 102 is 1.6, for example, and the refractive index $n2$ of the second dielectric layer 103 is 2.2, for example.

As a material of the first dielectric layer 102, $SiO_2$, MgO, $ZrSiO_4$, $Al_2O_3$, $CeF_3$, $LaF_3$, $MgF_2$, $MgSiO_3$, $Si_3N_4$ or $YF_3$, for example, can be used. And as a material of the second dielectric layer 103, ZnS—$SiO_2$, AlN, ZnS, $CeO_2$, $Dy_2O_3$, $HfO_2$, $In_2O_3$, $Nb_2O_5$, $Si_3N_4$, $Ta_2O_5$, ZnO, $ZrO_2$, $Y_2O_3$, $TiO_2$ or $Bi_2O_3$, for example, can be used. For any of the materials used for the first dielectric layer 102 and the second dielectric layer 103, it is preferable that the refractive index is at least 1 or more, and that the material is transparent.

The intermediate layer between an information layer and an information layer, and a cover layer between the fourth information layer L3 and the surface of the optical disc 1, are formed as follows.

Each intermediate layer is formed according to the following procedure after the multilayer thin film is deposited. First a UV-curing resin is coated by a spin coat method. Then a transparent substrate, for transferring a guiding groove, is superimposed in a vacuum, so that the transfer surface contacts the UV-curing resin. After curing the resin by irradiating ultraviolet, the transparent substrate is peeled, and the intermediate layer is completed. Here an acrylic resin material, to which titania type filler is added, is used for the UV-curing resin. The refractive index after curing is 1.8 with light having a 405 nm wavelength.

For the cover layer, the same UV-curing resin as that of the intermediate layer is coated by a spin coat method after laminating the multilayer thin film of the fourth information layer L3, and is simply cured by ultraviolet. The thickness of the cover layer is 3 μm, and the thickness of each intermediate layer is 2 μm.

It is preferable that the thickness of the cover layer is 4 μm or less, and it is even more preferable if it is 1 μm or less. This is because the optical loss inside the UV-curing resin can be decreased as the thickness of the cover layer is decreased, so the S/N of the reproduction signal can be improved. However the process to coat the UV-curing resin at a uniform thickness becomes complicated as the thickness of the cover layer decreases, so the thickness of the cover layer is set to 3 μm in the experiment of the present embodiment.

It is preferable that the thickness of the intermediate layer is 1.5 μm or more. This is because the crosstalk from other information layers can be sufficiently decreased.

Considering the preferable range of the thickness of the cover layer and the intermediate layer, a desirable upper limit value of dn/d0 is 4/(4+1.5)=8/11 in the case of an optical disc having two information layers. Here dn is a distance from the surface of the optical disc 1 to the closest information layer, and d0 is a distance from the surface of the optical disc 1 to the most distant information layer. In the case of an optical disc having n (n≧3) number of information layers, the distance d0 from the surface of the optical disc to the most distant information layer is longer than the distance d0 of an optical disc having two information layers, so a desirable upper limit value of dn/d0 is smaller than at least 8/11. In the case of the experiment of the present embodiment, having four information layers, for example, dn/d0=3/(3+2+2+2)=1/3 is preferable.

It is preferable that the refractive index of the cover layer and the intermediate layer of the optical disc 1 is equal to or greater than an equivalent numerical aperture NA of the SIL 13. In this case, the coupling efficiency of the near-field light and the recording medium can be increased.

It is preferable that the equivalent numerical aperture NA of the SIL 13 is greater than 1. In this case, a micro-light spot can be obtained, and information can be recorded or reproduced at high density.

The oscillation wavelength of the laser 4 is 405 nm. For the SIL 13, a lens which is hemispherical and plane side has a taper cut is used. The equivalent numerical aperture NA of the SIL 13 is 1.84.

For the actuator 15, beam expander 9, focus detection circuit 23, focus control circuit 24 and system control circuit 20, the components of an optical disc evaluation machine which uses far-field light (that is, near-field light is not used) are used. The distance detection circuit 21, distance control circuit 22 and tilt control circuit 26 are fabricated based on the configuration described in the above mentioned embodiment.

Figure 5:
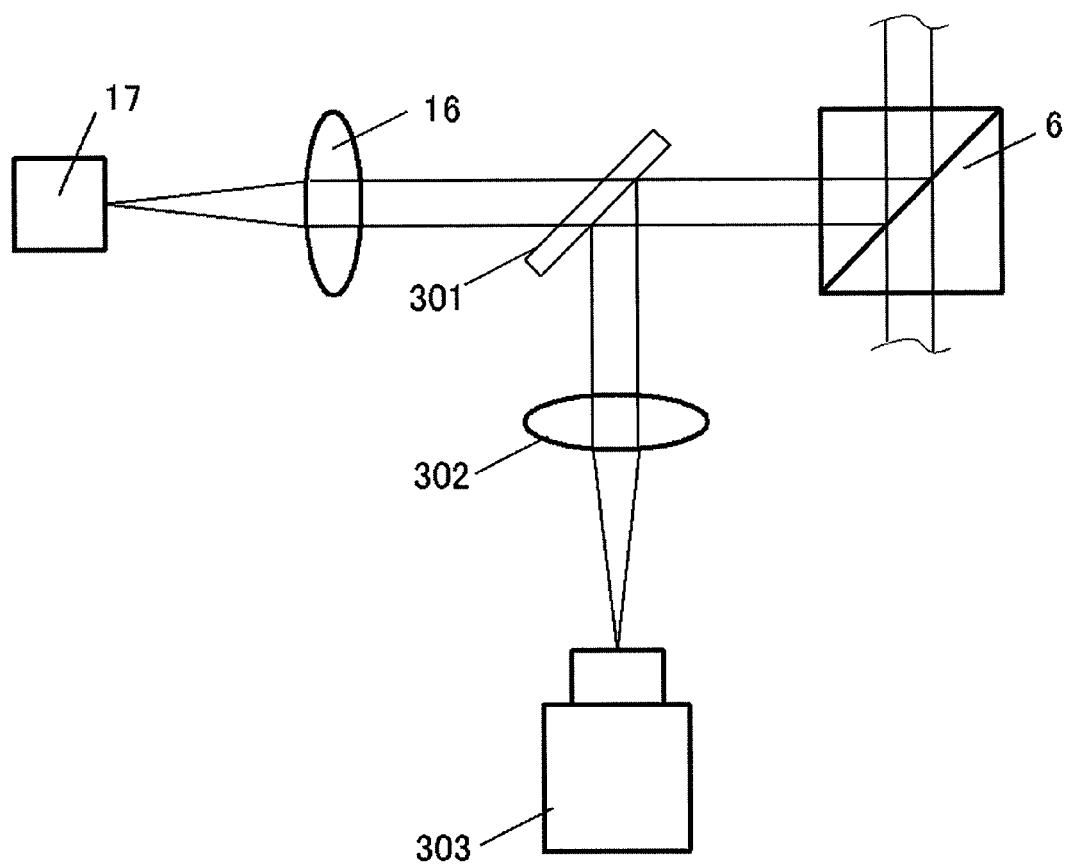
FIG. 5 is a diagram depicting a configuration of a first detection system according to an experiment of the present embodiment.

FIG. 5 is a diagram depicting a configuration of the first detection system according to the experiment of the present embodiment. In order to monitor the size of the return light spot 203, the first detection system 27 has the configuration shown in FIG. 5. In the first detection system shown in FIG. 5, a half mirror 301 is disposed between the non-polarization beam splitter 6 and the first detection lens 16. The half mirror 301 branches a part of the return light reflected by the non-polarization beam splitter 6. The branched light is focused by a detection lens 302, and is received by a CCD camera 303. A display (not shown) connected to the CCD camera 303 displays the return light spot.

Since the focal length of the detection lens 302 is longer than the focal length of the first detection lens 16, the size of the return light spot in the first detector 17 and the size of the return light spot in the light receiving surface of the CCD camera 303 do not match. But the sizes of these return light spots are in a proportional relationship, therefore the size of the return light spot in the first detector 17 can be estimated based on the size of the return light spot on the light receiving surface of the CCD camera 303.

The sizes of the two sub-detectors 201 and 202 are both 60 μm (x axis direction)×120 μm (direction orthogonal to the x axis) of a rectangle. A preamplifier for converting photoelectric current, generated by the received light, into voltage, is built in to these sub-detectors 201 and 202, for example.

Figure 6:
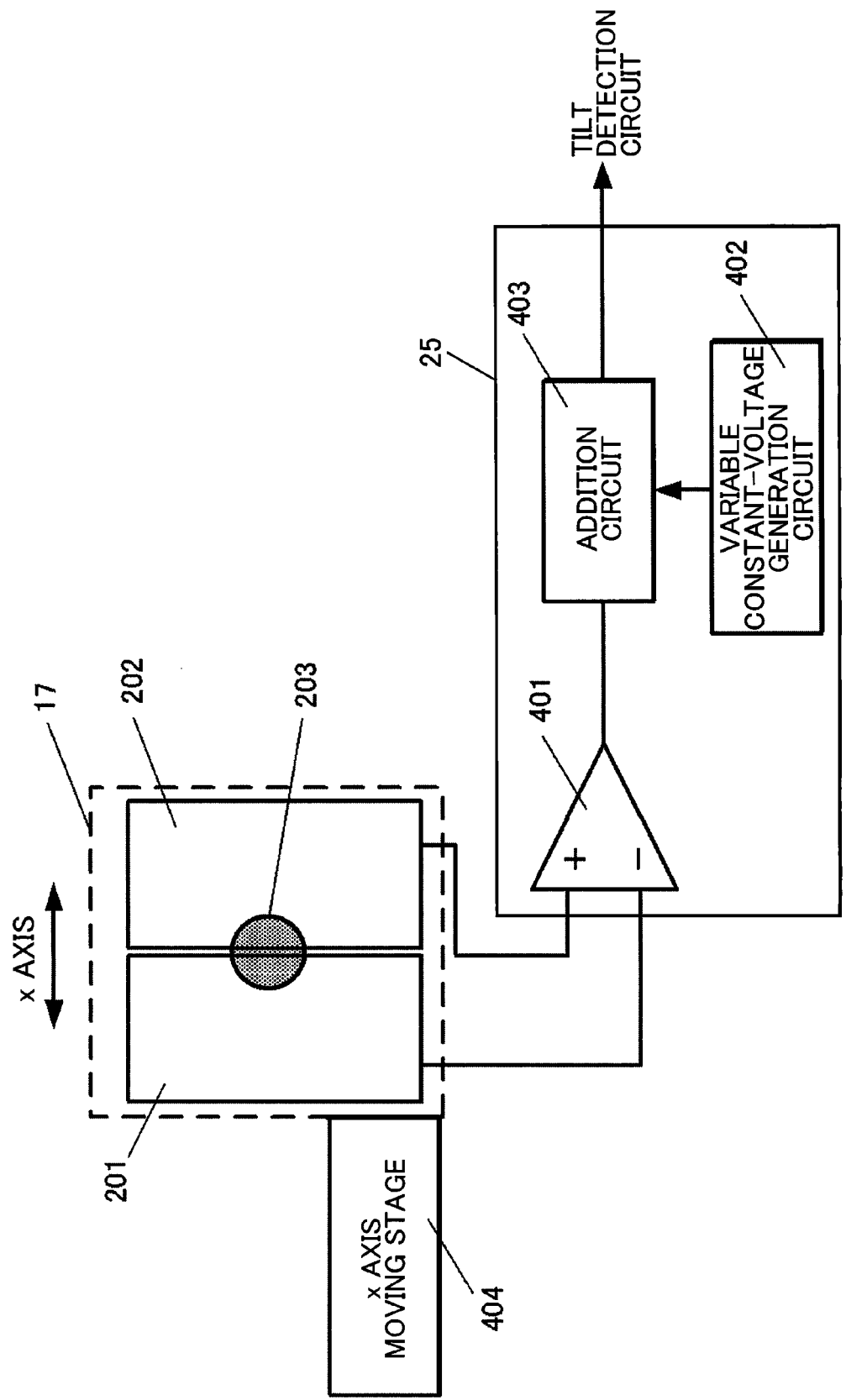
FIG. 6 is a diagram depicting a configuration of a tilt detection circuit according to the experiment of the present embodiment.

FIG. 6 is a diagram depicting a configuration of the tilt detection circuit according to the experiment of the present embodiment. The tilt detection circuit 25 has the configuration shown in FIG. 6. In the tilt detection circuit 25, a variable constant-voltage generation circuit 402 and an addition circuit 403 are newly disposed.

The variable constant-voltage generation circuit 402 can generate a constant positive, negative or zero voltage, and the voltage value thereof can be adjusted. The addition circuit 403 outputs a tilt detection signal generated by adding the output of the variable constant-voltage generation circuit 402 and the output of the differential circuit 401. Thereby it can be verified via experiment whether the offset voltage generated in the tilt detection signal can be electrically corrected (in other words, cancelled) or not when the position of the first detector 17 shifts. Further, in order to simulate the positional shift of the first detector 17 by experiment, an x axis moving stage 404 is secured to the first detector 17, so that the first detector 17 can be moved in the x axis direction shown in FIG. 6.

In the experiment of the present embodiment, an optical system and circuit for controlling the tracking servo, an optical system and circuit for reproducing information, and a circuit for generating the waveform of a recording pulse are also used, although none illustrated. For these components as well, those of the optical disc evaluation machine, which uses far-field light, are used.

Using the above mentioned configuration, an experiment to record or reproduce information by focusing a laser beam on the first information layer L0 of the optical disc 1 was performed.

In a state of stopping the rotation of the optical disc 1, the laser 4 is irradiated with setting the reproduction power thereof to 0.8 mW. The gap servo is operated by the distance control circuit 22, so that the distance between the SIL 13 and the surface of the optical disc 1 is 25 nm. The beam expander 9 is controlled to be in a position for focusing the laser beam near the first information layer L0. The size of the return light spot 203 is a 100 μm diameter (size is defined using the strength to be $1/e^2$). This size of the return light spot 203 is about the size of the light spot of the laser beam that enters the detector in a conventional standard optical disc drive. Therefore if the detector has the size to receive this return light spot, the frequency characteristic sufficient for servo control can be obtained.

The optical disc 1 is rotated by driving the spindle motor (not illustrated), so that the line speed of the optical disc 1 becomes 2.5 m/s, then the tracking servo is operated to be in the still state.

Setting the channel clock cycle Tw to 15 ns, the recording pulse is generated at an 8 Tw cycle, so that a recording mark and a space can be alternately formed. Setting the recording power of the laser 4 to 20.0 mW and the erasing power to 8.0 mW, the emission waveform of the laser beam is modulated based on recording pulses, so as to form the recording marks and spaces in an 8 Tw cycle for one rotation of the recording track.

After recording ends, the laser 4 is returned to the reproduction power, and recorded tracks are reproduced. Then the position of the beam expander 9 is fine-adjusted so that the amplitude of the reproduction signal at an 8Tw cycle becomes the maximum. Furthermore, the tilt of the SIL 13 is adjusted so that the output voltage from the tilt detection signal becomes zero in the state of setting the output voltage from the variable constant-voltage generation circuit 402 to zero. Thereby the emission surface of the SIL 13 and the surface of the optical disc 1 become parallel, and the laser beam focuses on the first information layer L0.

In this state, the position of the beam expander 9 is moved, so that the laser beam focuses on the light entrance surface side. In observing the state of the return light spot at this time by the CCD camera 303, it was discovered that the size of the return light spot is smaller than the state of the laser beam focusing on the first information layer L0. This shows that the size of the return light spot changes depending on the position of the optical disc 1 where the laser beam focuses.

Then while keeping the laser beam focused on the first information layer L0, the x axis moving stage 404 is moved to intentionally shift the center of the return light spot 203 from the center of the two sub-detectors 201 and 202. The stability of tilt control is observed while monitoring the output voltage from the sub-detectors 201 and 202 in this state. The ratio R of offset voltage to the voltage corresponding to the total quantity of light, which enters the two sub-detectors, is determined based on the following Expression (2), where b1 is the output voltage from the sub-detector 201, and b2 is the output voltage from the sub-detector 202.

$$R=|b1-b2|/(b1+b2) \quad (2)$$

While changing the moving amount of the x axis moving stage 404, the ratio R of the offset voltage and the stability of tilt control show the following relationship.

(1) In the case of $0<R\leq0.15$, the tilt control is stably operated while the output voltage of the variable constant-voltage generation circuit 402 remains zero.

(2) In the case of $0.15<R\leq0.30$, the tilt control is stably operated by generating voltage from the variable constant-voltage generation circuit 402, and adjusting the voltage so as to correct the offset voltage which is generated in the output of the differential circuit 401.

(3) In the case of $0.30<R\leq0.95$, the tilt control is operated by generating voltage from the variable constant-voltage generation circuit 402, and adjusting the voltage so as to correct the offset voltage which is generated in the output of the differential circuit 401. However compared with the case of the above mentioned (2), stability of the tilt control is not very good when an optical disc with a large warp is used.

(4) In the case of $R>0.95$, the tilt control is not operated regardless what voltage is generated from the variable constant-voltage generation circuit 402.

Based on the above experiment result, the change of the size of the return light spot, when the laser beam is focused on the first information layer L0 and the fourth information layer L3, is estimated by calculation.

It is assumed that the distance from the surface of the optical disc 1 to the first information layer L0 is d0, and the distance from the surface of the optical disc 1 to the fourth information layer L3 is d3. It is assumed that the size of the return light spot 203 in the first detector 17, when the laser beam is focused on the first information layer L0, is Sd0, and the size of the return light spot 203 in the first detector 17, when the laser beam is focused on the fourth information layer L3, is Sd3. It is assumed that the light spot size on the emission surface of the SIL 13, when the laser beam is focused on the first information layer L0, is Ss0, and the light spot size on the emission surface of the SIL 13, when the laser beam is focused on the fourth information layer L3, is Ss3. And it is assumed that the distance from the emission surface of the SIL 13 to the surface of the optical disc 1 (that is the gap distance) is negligibly small compared with the distance d0 and the distance d3. Then the ratio of the sizes Sd3/Sd0 of the return light spots 203 in the first detector 17 and the ratio of the light spot sizes Ss3/Ss0 on the emission surface of the SIL 13 are given by the following Expression (3).

$$Sd3/Sd0=Ss3/Ss0=d3/d0 \quad (3)$$

Therefore the size Sd3 of the return light spot 203, when the laser beam is focused on the fourth information layer L3, is given by the following Expression (4), and Sd3 becomes smaller as d3/d0 is smaller.

$$Sd3=(d3/d0)\times Sd0 \quad (4)$$

Now the offset voltage, which is generated when the position of the first detector 17 is shifted when the return light is entering the first detector 17 to generate a light spot having a predetermined size, will be described using a calculation model.

Figure 7:
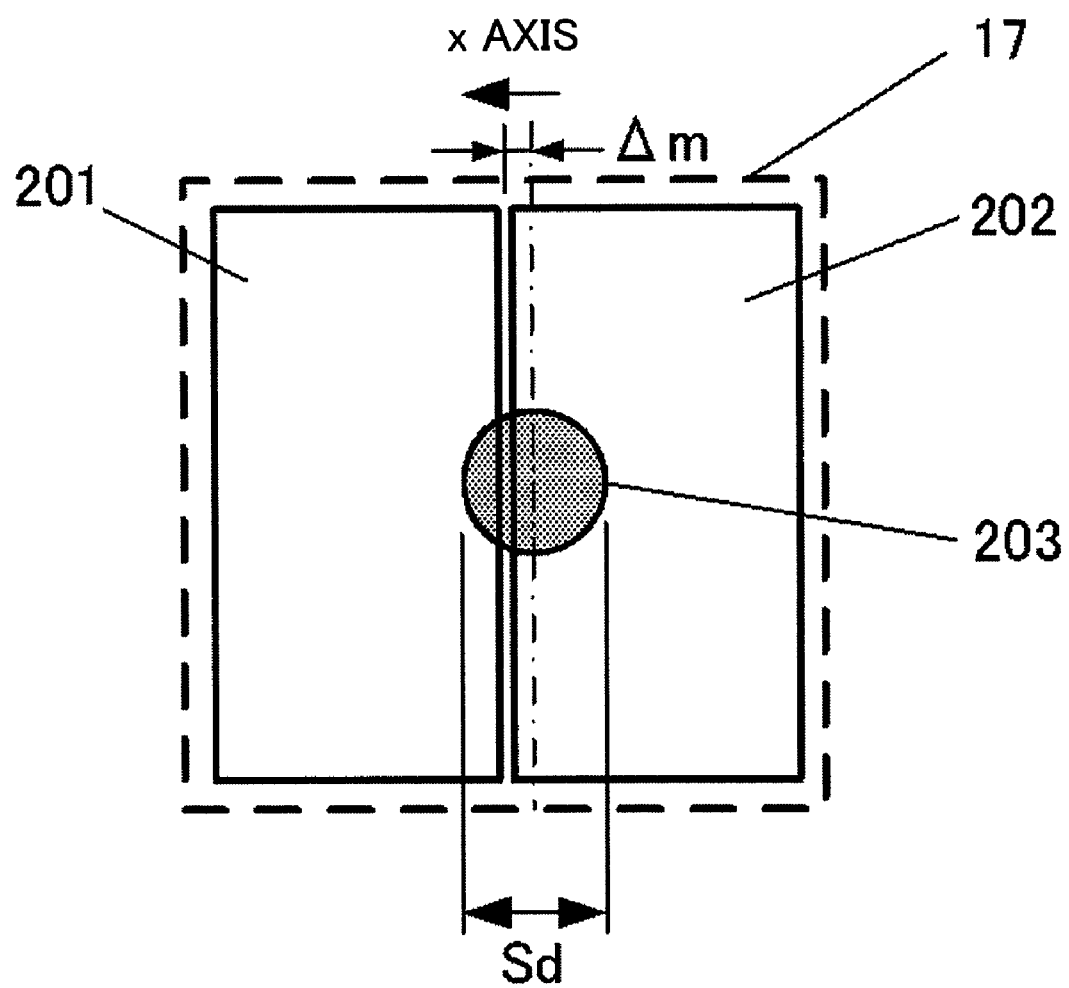
FIG. 7 is a diagram depicting an example of a calculation model according to the present embodiment.

FIG. 7 is a diagram depicting an example of a calculation model according to the present embodiment. In the case of the calculation model shown in FIG. 7, an intermediate position of the two sub-detectors 201 and 202 and the center position of the return light spot 203 are shifted by $\Delta m$ in the x axis direction. Here the size (diameter) of the return light spot 203 is defined as Sd.

If the intensity of the return light spot 203 is assumed Gaussian distribution, then the intensity I at an arbitrary position (x, y), when the center of the return light spot 203 is the origin, is given by the following Expression (5).

$$I = \exp\left[-\frac{2(x^2+y^2)}{\left(\frac{Sd}{2}\right)^2}\right] \quad (5)$$

If the distance of the gap between the sub-detectors 201 and 202 is negligibly small compared with the size of the return light spot 203, then the quantity of the light I1, which enters the sub-detector 201 and the quantity of light I2 which enters the sub-detector 202, are given by the following Expression (6) and Expression (7) respectively.

$$I1 = \int_{-\infty}^{\infty}\int_{-\infty}^{-\Delta m}\exp\left[-\frac{2(x^2+y^2)}{\left(\frac{Sd}{2}\right)^2}\right]dxdy \quad (6)$$

$$I2 = \int_{-\infty}^{\infty}\int_{-\Delta m}^{\infty}\exp\left[-\frac{2(x^2+y^2)}{\left(\frac{Sd}{2}\right)^2}\right]dxdy \quad (7)$$

The voltages b1 and b2, which are output from the sub-detectors 201 and 202, are values in proportion to the quantity of lights I1 and I2 respectively, so the ratio R of the offset voltage (offset quantity of light) to the voltage corresponding to the total quantity of light that enter the two sub-detectors 201 and 202, is given by the following Expression (8).

$$R=|I1-I2|/(I1+I2) \quad (8)$$

Figure 8:
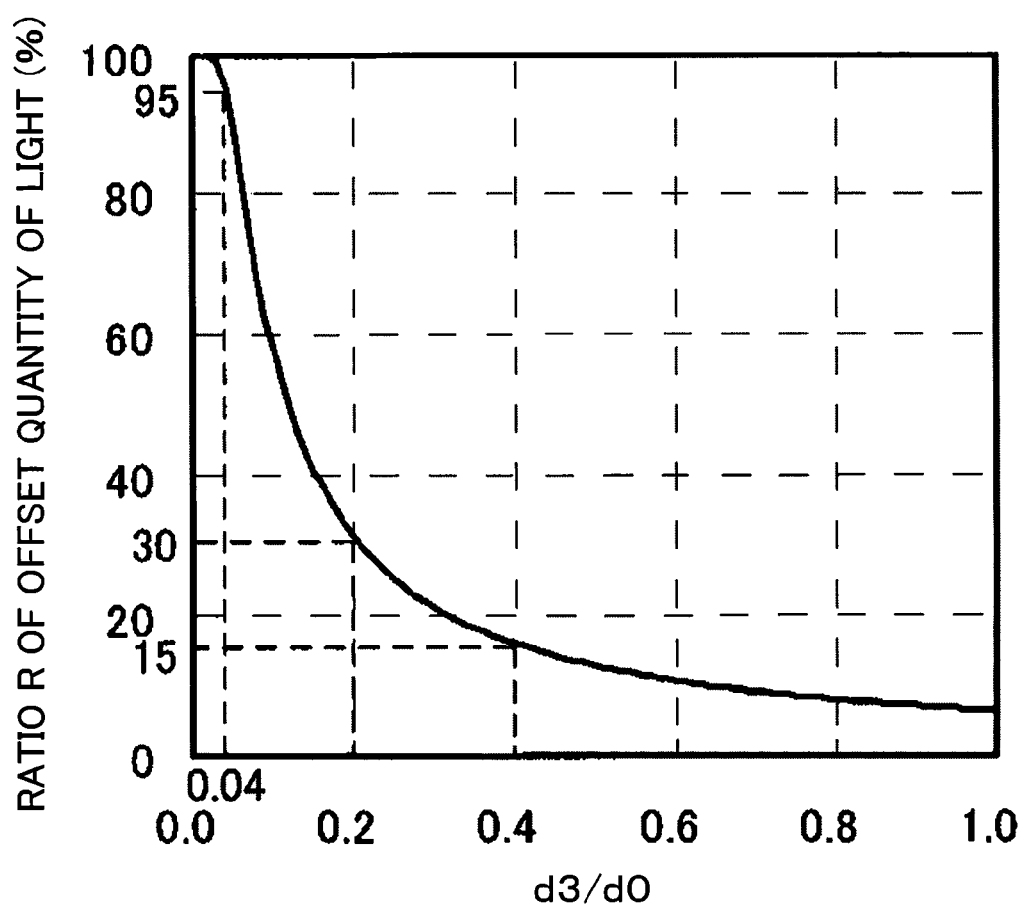
FIG. 8 is a graph plotting the relationship between d3/d0 and the ratio R of the offset quantity of light in the experiment of the present embodiment.

While changing the size Sd of the return light spot 203 in a 0 μm to 100 μm range, d3/d0 (=Sd3/Sd0) and the ratio R of the offset quantity of light are calculated. FIG. 8 is a graph plotting the relationship of d3/d0 (=Sd3/Sd0) and the ratio R of the offset quantity of the light in the experiment of the present embodiment. Here the size Sd0 of the return light spot 203, when the laser beam is focused on the first information layer L0, is set to 100 μm based on the above mentioned experiment. The positional shift amount $\Delta m$ is set to 2 μm since the positional shift amount of the detector, due to temperature change and aging, is regarded as about 2 μm in the case of a pickup of a conventional standard optical disc drive.

Combining the calculation result shown in FIG. 8 and the above mentioned experiment result, the following was discovered about the positional shift of the detector, due to aging and temperature characteristics of the pickup and the stability of tilt control.

(1) In the case of $d3/d0\geq 0.4$ (that is $d3\geq d0\times(2/5)$), R becomes R 0.15, so even if a positional shift occurs to the detector, tilt control can be stably performed without adjusting the output voltage of the variable constant-voltage generation circuit 402 (that is, with voltage remaining at zero), which is most desirable.

(2) In the case of $d3/d0\geq 0.2$ (that is $d3\geq d0\times(1/5)$), R becomes R 0.30, tilt control can be stably performed by adjusting the voltage using the variable constant-voltage generation circuit 402, so as to correct the offset voltage, which is most desirable after the above mentioned (1).

(3) In the case of $d3/d0\geq 0.04$ (that is $d3\geq d0\times(1/25)$), R becomes $R\leq 0.95$, so tilt control can be stably performed by adjusting the voltage using the variable constant-voltage generation circuit 402 so as to correct the offset voltage, if the warp of the optical disc is relatively small, which is most desirable after the above mentioned (2).

As described above, according to the present embodiment, the distance d3 from the disc surface to the fourth information layer L3 is equal to or greater than the distance value generated by multiplying the distance d0 from the disc surface to the first information layer L0 by a predetermined value. Thereby tilt control can be stably performed, even if the position of the detector is shifted due to aging and temperature characteristics of the pickup.

In other words, the distance d0 from the light entrance surface of the optical disc 1 to the first information layer which is most distant from the light entrance surface and the distance dn from the light entrance surface of the optical disc 1 to the Nth information layer which is closest to the light entrance surface satisfy the relationship of the following Expression (9).

$$dn \geq d0 \times (1/25) \quad (9)$$

As described above, the optical disc 1 has at least N (N is an integer of 2 or greater) number of information layers. And the distance d0 from the light entrance surface of the optical disc 1 to the first information layer, which is most distant from the light entrance surface and the distance dn from the light entrance surface of the optical disc 1 to the Nth information layer which is closest to the light entrance surface, satisfy the relationship of $dn \geq d0 \times (1/25)$.

Since the difference of the light spot sizes on the first detector 17 between the case of recording or reproducing information to/from the first information layer which is most distant from the light entering surface of the optical disc 1 and the case of recording or reproducing information to/from the Nth information layer which is closest to the light entrance surface of the optical disc 1, can be sufficiently small, the offset generated in the electric signal which is output from the first detector 17 can be decreased, and accurate servo control can be performed. A drop in frequency characteristics of the electric signal from the first detector 17 can also be prevented.

It is preferable that the distance dn and the distance d0 satisfy the relationship of the following Expression (10).

$$dn \geq d0 \times (2/5) \quad (10)$$

Since the distance dn and the distance d0 satisfy the relationship of $dn \geq d0 \times (2/5)$, the offset amount in particular can be decreased, and it is unnecessary to electrically compensate the offset, therefore configuration of the electric system can be simplified.

It is even more preferable that the distance dn and the distance d0 satisfy the relationship of the following Expression (11).

$$dn < d0 \times (8/11) \quad (11)$$

Although the size of the emission surface of the SIL 13 was not referred to in the description on the configuration of the present embodiment, it is preferable that the distance d0, refractive index n of the SIL 13, equivalent numerical aperture NA of the SIL 13 and the diameter φ of the emission surface of the SIL 13 satisfy the relationship of the following Expression (12).

$$d0 \leq \phi/(2\tan(\sin^{-1}(NA/n))) \quad (12)$$

This will be described with reference to FIG. 9.

Figure 9:
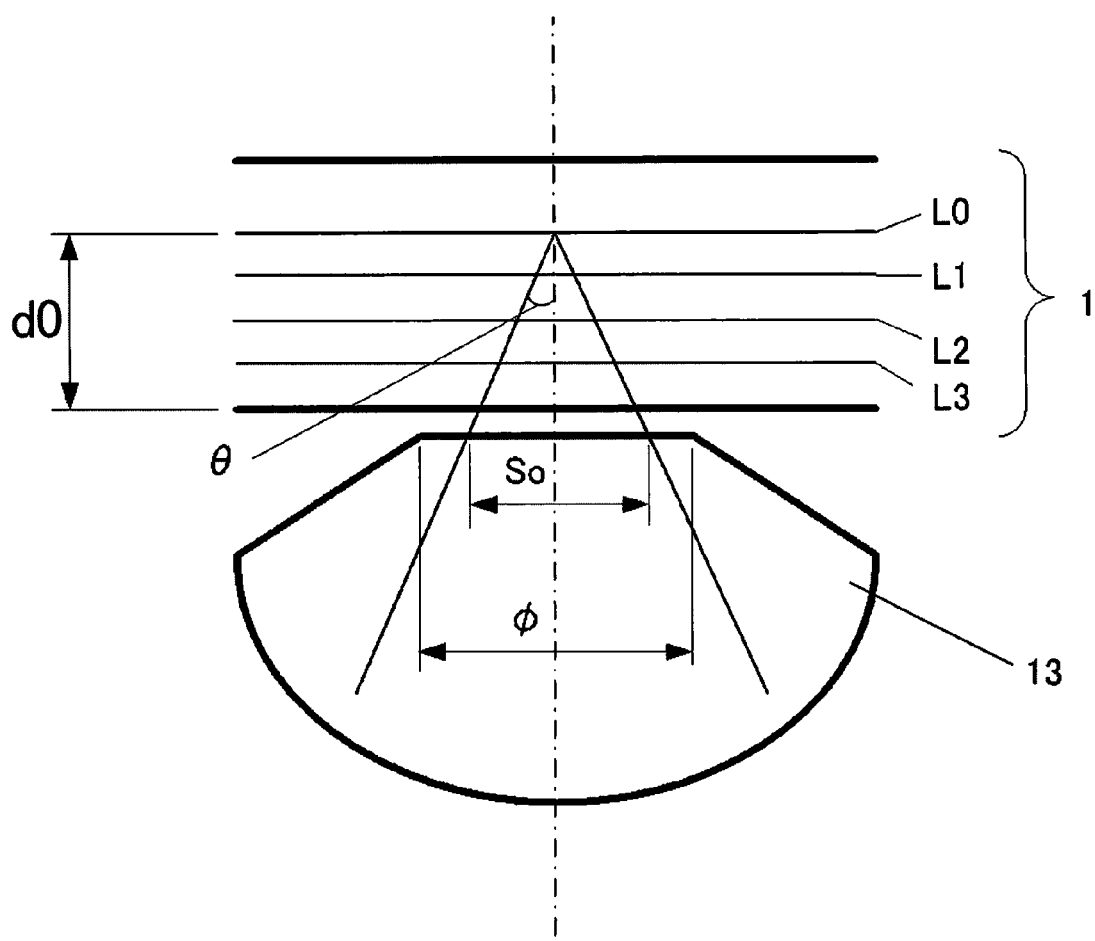
FIG. 9 is a diagram depicting optical paths in the case of focusing laser beams on the first information layer of a four-layer optical disc.

FIG. 9 is a diagram depicting the optical path when the laser beam is focused on the first information layer L0 of the four-layer optical disc. Since the first information layer L0 is an information layer which is most distant from the light entrance surface, the size of the optical spot on the emission surface of the SIL 13 becomes the maximum. Here the numerical aperture NA is defined as NA=n×sin θ, and θ can be solved by $\theta=\sin^{-1}(NA/n)$. If the size (diameter) of the light spot on the emission surface of the SIL 13 is So, tan θ=(So/2)/d0=So/(2×d0), therefore So can be solved by So=d0×2 tan θ.

If the size So of the light spot on the emission surface of the SIL 13 is greater than the diameter φ of the emission surface, a part of the laser beam is eclipsed by the emission surface of the SIL 13, which decreases transmission efficiency of the laser beam to the optical disc 1. Therefore So≦φ is preferable. Since φ≧d0×2 tan θ, d0 can be solved by $d0 \leq \phi/(2 \tan \theta) = \phi/(2\tan(\sin^{-1}(NA/n)))$.

In the present embodiment, the effect in the tilt control is described, but the present invention can be applied similarly to other control units and determination units which detect the return light by the sub-detectors, and perform predetermined control or determination using the detected result.

A method for determining an information layer of the plurality of information layers on which the laser beam is focusing, based on the size of the light spot on the detector, will be described with reference to FIG. 10, FIG. 11A and FIG. 11B.

Figure 10:
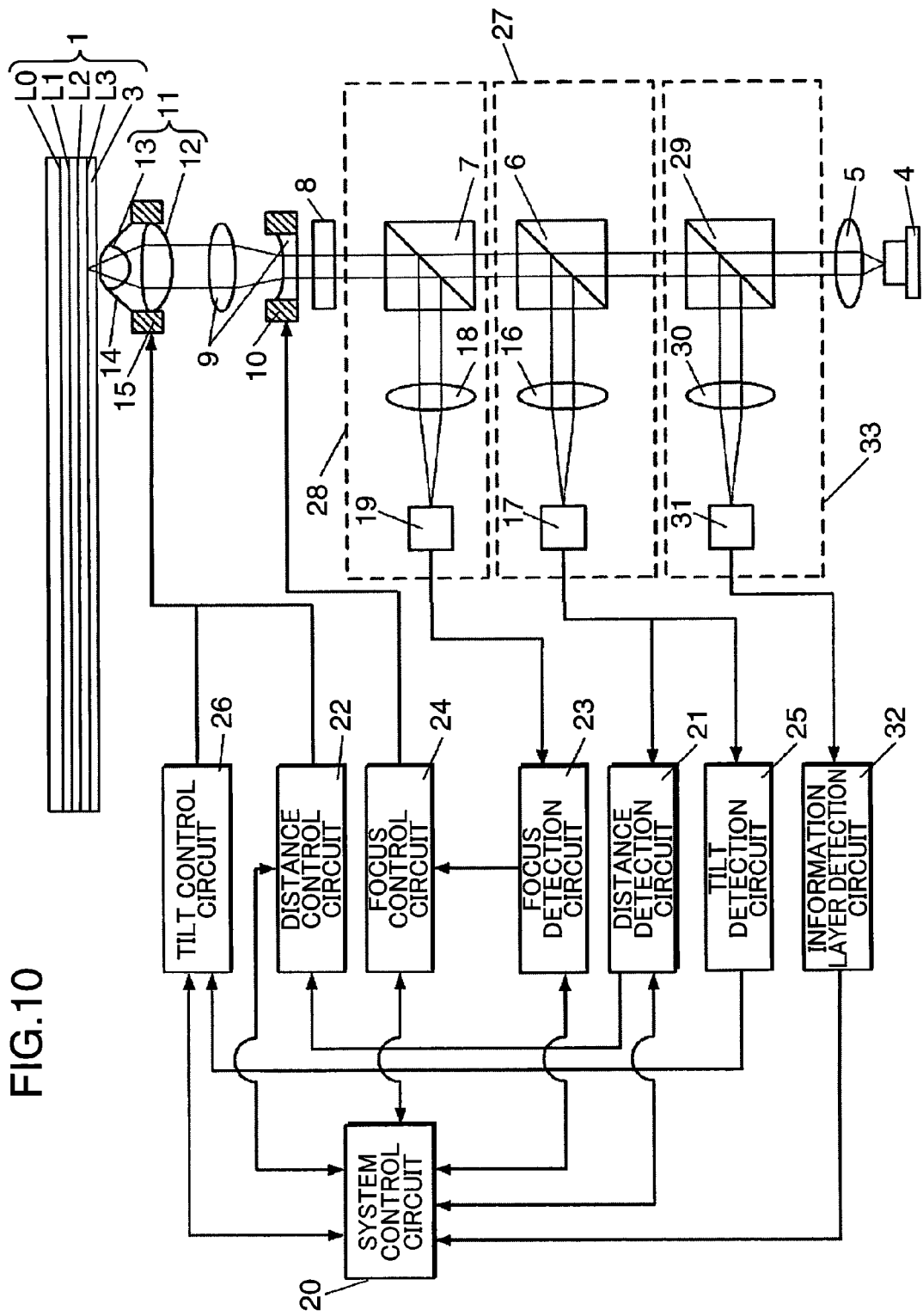
FIG. 10 is a diagram depicting a configuration of an optical information recording and/or reproducing apparatus according to a variant form of the present embodiment.

FIG. 10 is a diagram depicting a configuration of an optical information recording and/or reproducing apparatus according to a variant form of the present embodiment. The optical information recording and/or reproducing apparatus shown in FIG. 10 has a non-polarization beam splitter 29, a third detection lens 30, a third detector 31 and an information layer detection circuit 32 in addition to the configuration of the optical information recording and/or reproducing apparatus shown in FIG. 1. In the optical information recording and/or reproducing apparatus shown in FIG. 10, a composing element the same as that of the optical information recording and/or reproducing apparatus shown in FIG. 1 is denoted with a same reference numeral for which description is omitted.

The non-polarization beam splitter 29 is a type of beam splitter of which reflection characteristic does not depend on the polarization direction. The non-polarization beam splitter 29 splits the return light from the area where the near-field light is generated.

The third detection lens 30 collects the return light split by the non-polarization beam splitter 29 to the third detector 31.

The third detector 31 includes a plurality of sub-detectors, corresponding to a number of information layers of the optical disc 1, and receives the return light. The third detector 31 outputs the electric signal according to the received quantity of return light. The third detector 31 will be described later with reference to FIG. 11A and FIG. 11B.

The information layer detection circuit 32 detects an information layer of the plurality of information layers, on which the laser beam is being collected, based on the return light received by the third detector 31. The information layer detection circuit 32 detects an information layer of the optical disc 1 on which near-field light is being collected, using an electric signal which is output from the third detector 31. In the variant form of the present embodiment, the information layer detection circuit 32 corresponds to an example of the information layer detection unit.

Figure 11A:
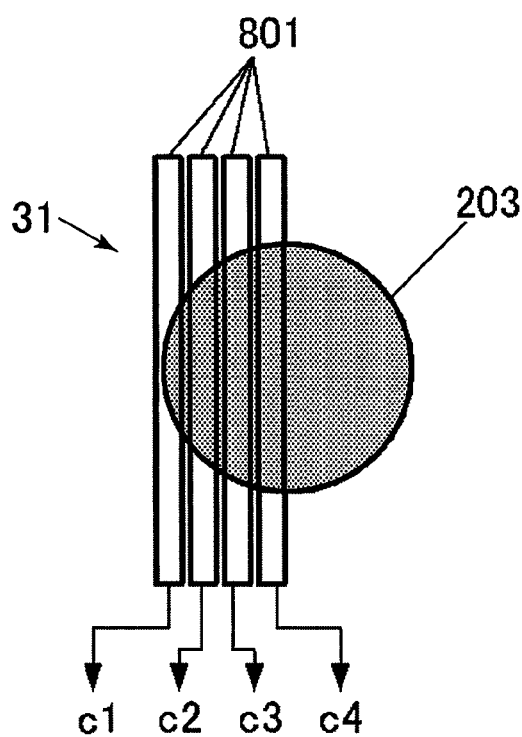
FIG. 11A is a diagram depicting a state of a return light spot on a third detector in the case of focusing laser beams on the first information layer.
Figure 11B:
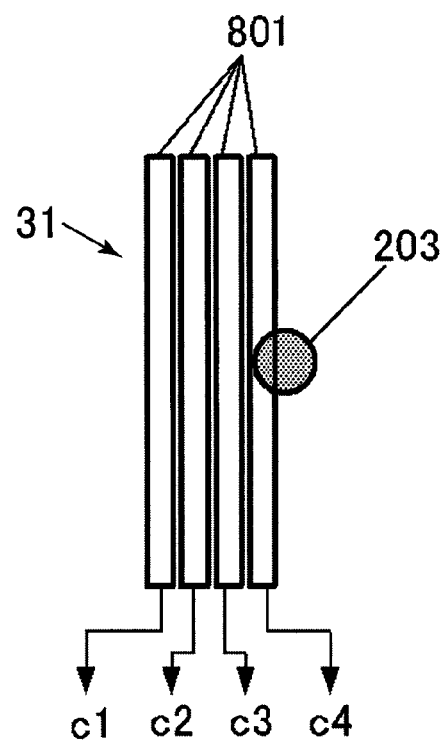
FIG. 11B is a diagram depicting a state of a return light spot on the third detector in the case of focusing laser beams on the fourth information layer.

FIG. 11A is a diagram depicting the state of the return light spot 203 on the third detector 31 when the laser beam is focused on the first information layer L0, and FIG. 11B is a diagram depicting the state of the return light spot 203 on the third detector 31 when the laser beam is focused on the fourth information layer L3. The third detector 31 consists of four sub-detectors 801. The size of each sub-detector 801 is optimized according to the size of the return light spot collected on each information layer of the first information layer L0 to the fourth information layer L3. Each sub-detector 801 outputs four electric signals: c1, c2, c3 and c4.

In FIG. 11A, the return light enters all the four sub-detectors 801. Therefore all of the four electric signals of c1, c2, c3 and c4 are output, and voltage, which is not zero and corresponds to the quantity of light which entered from all the sub-detectors 801, is obtained. In FIG. 11B, on the other hand, the return light enters only at the right end, out of the four sub-detectors 801. Therefore only electric signal c4 is output, and voltage which is not zero is obtained from one of the four sub-detectors 801. This means that a number of electric signals having a voltage value which is not zero changes depending on the information layer on which the laser beam is focusing. The information layer detection circuit 32 can easily determine an information layer on which the laser beam is collected, by measuring the number of electric signals of which voltage value is not zero.

In other words, if a number of electric signals of which voltage is not zero is 1, the information layer detection circuit 32 determines that the laser beam is collected on the fourth information layer L3, and if a number of electric signals of which voltage value is not zero is 4, then the information layer detection circuit 32 determines that the laser beam is collected on the first information layer L0.

In the present embodiment, the optical disc having four layers, the first information layer L0 to the fourth information layer L3, was described, but the present invention can be applied similarly to an optical disc having N (2 or more) number of layers: the first information layer L0 to the Nth information layer L(n−1).

In the present embodiment, the output of the first detector 17 is shared by the distance detection circuit 21 and the tilt detection circuit 25, but outputs of different detectors may be used respectively. However if the detector is shared by the distance detection circuit 21 and the tilt detection circuit 25, the configuration of the apparatus can be more simplified, and the manufacturing cost of the apparatus can be decreased, which is advantageous.

The conditions of the optical system, recording conditions, reproduction conditions or the like, used for the above embodiment, are not limited to these conditions, but appropriate conditions can be set according to the characteristics of the apparatus and recording medium. The size of the detector, size of the return light spot, thickness of the cover layer, distance between each information layer of the multilayer disc or the like are examples, and can be changed within the scope that does not depart from the spirit of the invention.

In the above mentioned embodiment, the optical information recording medium is a rewritable medium using phase change material, but the present invention is not limited to this, but a rewritable medium using magneto-optical material, or a write-once type medium using coloring material, may be used, or a read only medium on which pits are formed may be used. The present invention can be applied to any medium only if information is recorded to or reproduced from the medium using near-field light.

An effect similar to the above mentioned effect can also be implemented for a personal computer, server, recorder or a semiconductor device using the above mentioned optical information recording and/or reproducing method and optical information recording and/or reproducing apparatus.

The above mentioned embodiment primarily includes information having the following configuration.

An optical information recording and/or reproducing apparatus according to an aspect of the present invention has: a focusing unit which generates near-field light and collects the near-field light on an optical information recording medium; a light receiving unit which receives light reflected by the optical information recording medium, and outputs an electric signal according to a quantity of the received light; and a distance control unit which controls a distance between the focusing unit and a light entrance surface of the optical information recording medium, using the electric signal that is output from the light receiving unit, and the optical information recording medium has at least N (N is an integer of 2 or greater) number of information layers, and a distance d0 from the light entrance surface of the optical information recording medium to a first information layer which is most distant from the light entrance surface, and a distance dn from the light entrance surface of the optical information recording medium to an Nth information layer which is closest to the light entrance surface, satisfy the relationship of $dn \geq d0 \times (1/25)$.

According to this configuration, the focusing unit generates near-field light and collects the near-field light on the optical information recording medium, the light receiving unit receives light reflected by the optical information recording medium, and outputs an electric signal according to the quantity of the received light, and the distance control unit controls the distance between the focusing unit and the light entrance surface of the optical information recording medium, using the electric signal that is output from the light receiving unit. The optical information recording medium has at least N (N is an integer of 2 or greater) number of information layers. And the distance d0 from the light entrance surface of the optical information recording medium to the first information layer which is most distant from the light entrance surface, and the distance dn from the light entrance surface of the optical information recording medium to the Nth information layer which is closest to the light entrance surface, satisfy the relationship of $dn \geq d0 \times (1/25)$.

Since the difference of the light spot size on the light receiving unit between the case of recording or reproducing information to/from the first information layer which is most distant from the light entrance surface of the optical information recording medium, and the case of recording or reproducing information to/from the Nth information layer which is closest to the light entrance surface of the optical information recording medium, can be sufficiently small, the offset generated in the electric signal, which is output from the light receiving unit, can be decreased, and servo control can be accurately performed.

In the above optical information recording and/or reproducing apparatus, it is preferable that the focusing unit includes a solid immersion lens, and the distance d0, a refractive index n of the solid immersion lens, an equivalent numerical aperture NA of the solid immersion lens, and a diameter φ of an emission surface of the solid immersion lens satisfy the relationship of $d0 \leq \phi/(2\tan(\sin^{-1}(NA/n)))$.

According to this configuration, the distance d0, the refractive index n of the solid immersion lens, the equivalent numerical aperture NA of the solid immersion lens, and the diameter φ of the emission surface of the solid immersion lens satisfy the relationship of $d0 \leq \phi/(2\tan(\sin^{-1}(NA/n)))$, so the emission light from the solid immersion lens can be efficiently propagated to the optical information recording medium.

It is preferable that the above optical information recording and/or reproducing apparatus further comprises a tilt control unit which controls the tilt of the entrance surface of the optical information recording medium and the light emission surface of the solid immersion lens, using the electric signal output from the light receiving unit.

According to this configuration, the tilt control unit controls the tilt of the entrance surface of the optical information recording medium and the light emission surface of the solid immersion lens using the electric signal output from the light receiving unit. Since offset is not generated in the electric signal output from the light receiving unit, the tilt of the entrance surface of the optical information recording medium and the light emission surface of the solid immersion lens can be stably controlled.

In the above optical information recording and/or reproducing apparatus, it is preferable that the light receiving unit is shared by the distance control unit and the tilt control unit, so as to output the electric signal to both the distance control unit and the tilt control unit.

According to this configuration, the distance control unit and the tilt control unit share the light receiving unit, so the configuration of the optical system can be more simplified, and manufacturing cost can be reduced.

In the above optical information recording and/or reproducing apparatus, it is preferable that the distance dn and the distance d0 satisfy the relationship of $dn \geq d0 \times (2/5)$. According to this configuration, the distance dn and the distance d0 satisfy the relationship of $dn \geq d0 \times (2/5)$, and in this case the offset amount in particular can be decreased, and there is no need to electrically compensate the offset, so the configuration of the electric system can be more simplified, and manufacturing cost can be reduced.

It is preferable that the above optical information reducing/reproducing apparatus further comprises an information layer detection unit for detecting, using the electric signal output from the light receiving unit, an information layer of the optical information recording medium, on which the near-field light is being collected.

According to this configuration, the information layer detection unit detects an information layer of the optical information recording medium, on which near-field light is being collected, using the electric signal output from the light receiving unit. Therefore an information layer where information is recorded or reproduced can be easily specified out of the plurality of information layers.

In the above optical information recording and/or reproducing apparatus, it is preferable that the equivalent numerical aperture NA of the solid immersion lens is greater than 1.

According to this configuration, the equivalent numerical aperture NA of the solid immersion lens is greater than 1, so a micro-light spot can be obtained, and information can be recorded or reproduced at high density.

An optical information recording and/or reproducing method according to another aspect of the present invention comprises: a collecting step of generating near-field light using a focusing unit, and collecting the near-field light on an optical information recording medium; a light receiving step of receiving light reflected by the optical information recording medium, and outputting an electric signal according to a quantity of the received light; and a distance controlling step of controlling a distance between the focusing unit and a light entrance surface of the optical information recording medium, using the electric signal that is output in the light receiving step, and the optical information recording medium has at least N (N is an integer of 2 or greater) number of information layers, and a distance d0 from the light entrance surface of the optical information recording medium to a first information layer which is most distant from the light entrance surface, and a distance dn from the light entrance surface of the optical information recording medium to an Nth information layer which is closest to the light entrance surface, satisfy the relationship of $dn \geq d0 \times (1/25)$.

According to this configuration, the collecting step is for generating near-field light using the focusing unit and collecting near-field light on the optical information recording medium, the light receiving step is for receiving light reflected by the optical information recording medium and outputting an electric signal according to a quantity of the received light, and the distance controlling step is for controlling the distance between the focusing unit and the light entrance surface of the optical information recording medium, using the electric signal that is output in the light receiving step. The optical information recording medium has at least N (N is an integer of 2 or greater) number of information layers, and the distance d0 from the light entrance surface of the optical information recording medium to the first information layer which is most distant from the light entrance surface and the distance dn from the light entrance surface of the optical information recording medium to the Nth information layer which is closest to the light entrance surface satisfy the relationship of $dn \geq d0 \times (1/25)$.

Since the difference of the light spot size on the light receiving unit between the case of recording or reproducing information to/from the first information layer which is most distant from the light entrance surface of the optical information recording medium, and the case of recording or reproducing information to/from the Nth information layer which is closest to the light entrance surface of the optical information recording medium, can be sufficiently small, the offset generated in the electric signal, which is output from the light receiving unit, can be decreased, and servo control can be accurately performed.

An optical information recording medium according to another aspect of the present invention is an optical information recording medium which records or reproduces information using near-field light generated by a focusing unit, and the optical information recording medium has at least N (N is an integer of 2 or greater) number of information layers, and a distance d0 from a light entrance surface of the optical information recording medium to a first information layer which is most distant from the light entrance surface, and a distance dn from the light entrance surface of the optical information recording medium to an Nth information layer which is closest to the light entrance surface, satisfy the relationship of $dn \geq d0 \times (1/25)$ and refractive indexes of a cover layer and an intermediate layer of the optical information recording medium are equal to or greater than an equivalent numerical aperture of the focusing unit.

According to this configuration, the optical information recording medium which records or reproduces information using near-field light generated by the focusing unit has at least N (N is an integer of 2 or greater) number of information layers. And the distance d0 from the light entrance surface of the optical information recording medium to the first information layer which is most distant from the light entrance surface, and a distance dn from the light entrance surface of the optical information recording medium to the Nth information layer which is closest to the light entrance surface satisfy the relationship of $dn \geq d0 \times (1/25)$. The refractive indexes of the cover layer and the intermediate layer of the optical information recording medium are equal to or greater than the equivalent numerical aperture of the focusing unit.

Since the difference of the light spot size on the light receiving unit between the case of recording or reproducing information to/from the first information layer which is most distant from the light entrance surface of the optical information recording medium, and the case of recording or reproducing information to/from the Nth information layer which is closest to the light entrance surface of the optical information recording medium, can be sufficiently small, the offset generated in the electric signal, which is output from the light receiving unit, can be decreased, and servo control can be accurately performed.

In the optical information recording medium, it is preferable that at least one information layer out of a plurality of information layers of the optical information recording medium is constituted by a multilayer thin film in which a dielectric layer, a phase-change recording layer, a dielectric layer, and a reflection layer are deposited in order from the light entrance surface side, and a material of the reflection layer includes an Ag alloy.

According to this configuration, the Ag alloy which has high thermal conductivity can suppress the conduction of heat in the thickness direction of the optical information recording medium, and can release the heat in the film surface direction of the reflection layer when information is recorded, so the possibility of thermal deterioration of the information recorded in adjacent information layers can be decreased.

In the above optical information recording medium, it is preferable that at least one information layer, other than the first information layer, out of a plurality of information layers of the optical information recording medium is constituted by a multilayer thin film in which a first dielectric layer, a second dielectric layer, a phase-change recording layer, a third dielectric layer, a reflection layer, and a fourth dielectric layer are deposited in order from the light entrance surface side, and a refractive index n0 of the cover layer and the intermediate layer, a refractive index n1 of the first dielectric layer, and a refractive index n2 of the second dielectric layer satisfy the relationship of n1<n0<n2.

According to this configuration, the thickness of the first dielectric layer can be increased, so the conduction of heat to the adjacent information layers can be decreased.

A solid immersion lens according to another aspect of the present invention is a solid immersion lens which generates near-field light, and collects the near-field light on an optical information recording medium, and the optical information recording medium has at least N (N is an integer of 2 or greater) number of information layers, and a distance d0 from a light entrance surface of the optical information recording medium to a first information layer which is most distant from the light entrance surface, and a distance dn from the light entrance surface of the optical information recording medium to an Nth information layer which is closest to the light entrance surface, satisfy the relationship of dn≧d0×(1/25), and a refractive index n of the solid immersion lens, an equivalent numerical aperture NA of the solid immersion lens, and a diameter of an emission surface of the solid immersion lens satisfy the relationship of d0≦φ/(2tan(sin$^{-1}$(NA/n))).

According to this configuration, the optical information recording medium has at least N (N is an integer of 2 or greater) number of information layers. And the distance d0 from the light entrance surface of the optical information recording medium to the first information layer which is most distant from the light entrance surface and distance dn from the light entrance surface of the optical information recording medium to the Nth information layer which is closest to the light entrance surface satisfy the relationship of dn≧d0×(1/25). Also the refractive index n of the solid immersion lens, the equivalent numerical aperture NA of the solid immersion lens, and the diameter φ of the emission surface of the solid immersion lens satisfy the relationship of d0≦φ/(2tan(sin$^{-1}$(NA/n))).

Since the difference of the light spot size on the light receiving unit between the case of recording or reproducing information to/from the first information layer which is most distant from the light entrance surface of the optical information recording medium, and the case of recording or reproducing information to/from the Nth information layer which is closest to the light entrance surface of the optical information recording medium, can be sufficiently small, the offset generated in the electric signal, which is output from the light receiving unit, can be decreased, and servo control can be accurately performed.

The embodiments and examples described in the section of "Description of Embodiments", are intended to clarify the technical content of the invention, and the present invention should not be interpreted in a narrow sense which restricts the invention only to these embodiments, and numerous modifications and variations can be made without departing from the spirit of the invention and scope of the Claims.

INDUSTRIAL APPLICABILITY

The optical information recording and/or reproducing apparatus, optical information recording and/or reproducing method, optical information recording medium and solid immersion lens according to the present invention, with which servo control can be stably performed even if a positional shift of the detector is generated due to aging and temperature characteristics of the pickup, are useful as the optical information recording and/or reproducing apparatus, optical information recording and/or reproducing method, optical information recording medium and solid immersion lens which use near-field light.

The invention claimed is:

1. An optical information recording and/or reproducing apparatus, comprising:
 a focusing unit which generates near-field light and collects the near-field light on an optical information recording medium;
 a light receiving unit which receives light reflected by the optical information recording medium, and outputs an electric signal according to a quantity of the received light; and
 a distance control unit which controls a distance between the focusing unit and a light entrance surface of the optical information recording medium, using the electric signal that is output from the light receiving unit,
 wherein the optical information recording medium has at least N (N is an integer of 3 or greater) number of information layers, and
 a distance d0 from the light entrance surface of the optical information recording medium to a first information layer which is most distant from the light entrance surface, and a distance dn from the light entrance surface of the optical information recording medium to an Nth information layer which is closest to the light entrance surface, satisfy the relationship of dn≧d0×(1/25).

2. The optical information recording and/or reproducing apparatus according to claim 1, wherein
 the focusing unit includes a solid immersion lens, and
 the distance d0, a refractive index n of the solid immersion lens, an equivalent numerical aperture NA of the solid immersion lens, and a diameter φ of an emission surface of the solid immersion lens satisfy the relationship of d0≦φ/(2tan(sin$^{-1}$(NA/n))).

3. The optical information recording and/or reproducing apparatus according to claim 2, further comprising a tilt control unit which controls the tilt of the entrance surface of the optical information recording medium and a light emission surface of the solid immersion lens, using the electric signal output from the light receiving unit.

4. The optical information recording and/or reproducing apparatus according to claim 3, wherein
the light receiving unit is shared by the distance control unit and the tilt control unit, so as to output the electric signal to both the distance control unit and the tilt control unit.

5. The optical information recording and/or reproducing apparatus according to claim 1, wherein
the distance dn and the distance d0 satisfy the relationship of $dn \geq d0 \times (2/5)$.

6. The optical information recording and/or reproducing apparatus according to claim 1, further comprising an information layer detection unit for detecting, using the light reflected by the optical information recording medium, an information layer of the optical information recording medium, on which the near-field light is being collected.

7. The optical information recording and/or reproducing apparatus according to claim 2, wherein the equivalent numerical aperture NA of the solid immersion lens is greater than 1.

8. An optical information recording and/or reproducing method, comprising:
a collecting step of generating near-field light using a focusing unit, and collecting the near-field light on an optical information recording medium;
a light receiving step of receiving light reflected by the optical information recording medium, and outputting an electric signal according to a quantity of the received light; and
a distance controlling step of controlling a distance between the focusing unit and a light entrance surface of the optical information recording medium, using the electric signal that is output in the light receiving step,
wherein the optical information recording medium has at least N (N is an integer of 3 or greater) number of information layers, and
a distance d0 from the light entrance surface of the optical information recording medium to a first information layer which is most distant from the light entrance surface, and a distance dn from the light entrance surface of the optical information recording medium to an Nth information layer which is closest to the light entrance surface, satisfy the relationship of $dn \geq d0 \times (1/25)$.

9. An optical information recording medium which records or reproduces information using near-field light generated by a focusing unit,
wherein the optical information recording medium has at least N (N is an integer of 3 or greater) number of information layers,
a distance d0 from a light entrance surface of the optical information recording medium to a first information layer which is most distant from the light entrance surface, and a distance dn from the light entrance surface of the optical information recording medium to an Nth information layer which is closest to the light entrance surface, satisfy the relationship of $dn \geq d0 \times (1/25)$, and
refractive indexes of a cover layer and an intermediate layer of the optical information recording medium are equal to or greater than an equivalent numerical aperture of the focusing unit.

10. The optical information recording medium according to claim 9, wherein
at least one information layer out of a plurality of information layers of the optical information recording medium is constituted by a multilayer thin film in which a dielectric layer, a phase-change recording layer, a dielectric layer, and a reflection layer are deposited in order from the light entrance surface side, and
a material of the reflection layer includes an Ag alloy.

11. The optical information recording medium according to claim 9, wherein
at least one information layer, other than the first information layer, out of a plurality of information layers of the optical information recording medium is constituted by a multilayer thin film in which a first dielectric layer, a second dielectric layer, a phase-change recording layer, a third dielectric layer, a reflection layer, and a fourth dielectric layer are deposited in order from the light entrance surface side, and
a refractive index n0 of the cover layer and the intermediate layer, a refractive index n1 of the first dielectric layer, and a refractive index n2 of the second dielectric layer satisfy the relationship of $n1 < n0 < n2$.

12. A solid immersion lens which generates near-field light and collects the near-field light on an optical information recording medium,
wherein the optical information recording medium has at least N (N is an integer of 3 or greater) number of information layers,
a distance d0 from a light entrance surface of the optical information recording medium to a first information layer which is most distant from the light entrance surface, and a distance dn from the light entrance surface of the optical information recording medium to an Nth information layer which is closest to the light entrance surface, satisfy the relationship of $dn \geq d0 \times (1/25)$, and
a refractive index n of the solid immersion lens, an equivalent numerical aperture NA of the solid immersion lens, and a diameter $\phi$ of an emission surface of the solid immersion lens satisfy the relationship of $d0 \leq \phi/(2\tan(\sin^{-1}(NA/n)))$.

* * * * *